United States Patent
Cooke et al.

(10) Patent No.: US 10,606,831 B1
(45) Date of Patent: *Mar. 31, 2020

(54) METHOD AND SYSTEM FOR IDENTIFYING ENTITIES

(71) Applicant: Aurea Software, Inc., Austin, TX (US)

(72) Inventors: David Cooke, Los Altos, CA (US);
Martin Betz, Palo Alto, CA (US);
Ashutosh Joshi, Fremont, CA (US);
Binay Mohanty, New Delhi (IN)

(73) Assignee: AUREA SOFTWARE, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/971,492

(22) Filed: May 4, 2018

Related U.S. Application Data

(63) Continuation of application No. 14/311,179, filed on Jun. 20, 2014, now Pat. No. 9,965,508, which is a
(Continued)

(51) Int. Cl.
| | |
|---|---|
| *G06F 7/02* | (2006.01) |
| *G06F 16/00* | (2019.01) |
| *G06F 16/245* | (2019.01) |
| *G06F 17/27* | (2006.01) |
| *G06F 16/26* | (2019.01) |

(Continued)

(52) U.S. Cl.
CPC ............ *G06F 16/245* (2019.01); *G06F 16/26* (2019.01); *G06F 16/353* (2019.01); *G06F 16/93* (2019.01); *G06F 17/2785* (2013.01)

(58) Field of Classification Search
CPC ............... G06F 17/30572; G06F 16/26; G06F 17/30707; G06F 16/353; G06F 17/30011; G06F 16/93; G06F 17/2785; G06F 17/30386; G06F 16/24; G06F 17/303; G06F 16/214
See application file for complete search history.

(56) References Cited

U.S. PATENT DOCUMENTS

| | | | |
|---|---|---|---|
| 8,321,398 B2* | 11/2012 | Aumann | G06F 16/334 707/706 |
| 8,359,327 B2* | 1/2013 | Bao | G06F 16/93 707/769 |

(Continued)

OTHER PUBLICATIONS

Notice of Allowance, dated Dec. 28, 2017, U.S. Appl. No. 14/311,179, pp. 1-11.

(Continued)

*Primary Examiner* — Bruce M Moser

(57) ABSTRACT

Some embodiments provide a program that identifies an entity having an entity attribute. The program receives, from each method of several methods, a set of candidate identity attributes that are each for identifying a particular entity having the entity attribute specified in the document. Each method of the several methods generates the corresponding set of candidate identity attributes based on the entity attribute specified in a document. The program calculates a score for each candidate identity attribute in the sets of candidate identity attributes. The program identifies, based on the sets of scores, an identity attribute from the sets of candidate identity attributes that identifies the entity having the entity attribute specified in the document.

19 Claims, 19 Drawing Sheets

Related U.S. Application Data continuation of application No. 13/274,287, filed on Oct. 14, 2011, now Pat. No. 8,782,042.

(51) Int. Cl.
  *G06F 16/93* (2019.01)
  *G06F 16/35* (2019.01)

(56) References Cited

U.S. PATENT DOCUMENTS

| | | | | |
|---|---|---|---|---|
| 2009/0234688 | A1* | 9/2009 | Masuyama | G06F 16/353 706/50 |
| 2009/0282012 | A1* | 11/2009 | Konig | G06F 17/278 |
| 2010/0306248 | A1* | 12/2010 | Bao | G06F 16/93 707/769 |
| 2012/0130705 | A1* | 5/2012 | Sun | G06F 17/2785 704/9 |

OTHER PUBLICATIONS

Notice of Allowance, dated Sep. 1, 2017, U.S. Appl. No. 14/311,179, pp. 1-19.

Amendment/Request for Consideration after Non-Final Rejection, dated Jul. 7, 2017, U.S. Appl. No. 14/311,179, pp. 1-12.

Non-Final Rejection, dated Feb. 7, 2017, U.S. Appl. No. 14/311,179, pp. 1-11.

Request for Continued Examination, dated Dec. 28, 2016, U.S. Appl. No. 14/311,179, pp. 1-15.

Final Rejection, dated Sep. 28, 2016, U.S. Appl. No. 14/311,179, pp. 1-19.

Amendment/Request for Reconsideration after Non-Final Rejection, dated Jul. 18, 2016, U.S. Appl. No. 14/311,179, pp. 1-9.

Non-Final Rejection, dated Apr. 18, 2016, U.S. Appl. No. 14/311,179, pp. 1-18.

Appeal Brief, dated Mar. 15, 2016, U.S. Appl. No. 14/311,179, pp. 1-33.

Notice of Appeal, dated Dec. 15, 2016, U.S. Appl. No. 14/311,179, pp. 1-2.

Final Rejection, dated Sep. 17, 2015, U.S. Appl. No. 14/311,179, pp. 1-19.

Amendment/Request for Reconsideration after Non-Final Rejection, dated Jun. 26, 2015, U.S. Appl. No. 14/311,179, pp. 1-10.

Non-Final Rejection, dated Mar. 26, 2015, U.S. Appl. No. 14/311,179, pp. 1-15.

* cited by examiner

|   | Identity Attribute | Token 1 | Token 2 | Token 3 |
|---|---|---|---|---|
| 1 | Company | Acme | Computers | International |
| 2 | Company | ABC | Computers | |
| 3 | Company | XYZ | Computers | International |
| 4 | Company | Acme | International | |
| 5 | Company | Acme | Computers | USA |

US 10,606,831 B1

METHOD AND SYSTEM FOR IDENTIFYING ENTITIES

BACKGROUND

Much of the content available on the World Wide Web today discusses, mentions, and/or refers to names of people. This content may include articles, blogs posts, "tweets", web pages, and many other types of documents. However, with the large amount of content that is available, it is often difficult to filter through and find content that is related to a particular person.

Today, search engines typically use key words to identify content that includes the key words. Although this technique may be useful for identifying content related to a name, identifying content related to a particular person with this name may be difficult because many people share the same name or have similar names. These search engines are usually not able to identify content related to a particular person with a particular name.

BRIEF SUMMARY

Some embodiments of the invention provide a novel method for identifying an entity based on a set of entity attributes (1) associated with the entity and (2) specified in a document. In some embodiments, the method identifies several different processes that each generates (1) a set of candidate identity attributes that are each potentially related to the entity based on the set of entity attributes specified in the document, and (2) a relevancy score for each candidate identity attribute. Based on the relevancy scores, the method of some embodiments identifies a set of identity attributes from the sets of candidate identity attributes in order to identify the entity that has the set of entity attributes specified in the document.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following description, numerous details, examples and embodiments are set forth for purpose of explanation. However, one of ordinary skill in the art will realize that the invention is not limited to the embodiments set forth and that the invention may be practiced without some of the specific details and examples discussed. For instance, some embodiments of the invention may be employed to identify geographical locations based on names (e.g., a city in a state or region, a street name, etc.) in documents.

Some embodiments of the invention provide a novel method for identifying an entity based on a set of entity attributes (1) associated with the entity and (2) specified in a document. In some embodiments, the method identifies several different processes that each generates (1) a set of candidate identity attributes that are each potentially related to the entity based on the set of entity attributes specified in the document, and (2) a relevancy score for each candidate identity attribute. Based on the relevancy scores, the method of some embodiments identifies a set of identity attributes from the sets of candidate identity attributes in order to identify the entity that has the set of entity attributes specified in the document. An identity attribute of some embodiments is an attribute used for identifying an entity (e.g., a person, a company, a city, a country, etc.). Examples of such an identity attribute include a name, a company affiliation, a title, an address, a social security number, an email address, geographical coordinates (e.g., longitude and latitude coordinates), language, population, etc. In some embodiments, a relevancy score is a value that represents a degree of correctness between a candidate identity attribute and the identity of an entity that has the entity attribute specified in the document.

Figure 1:
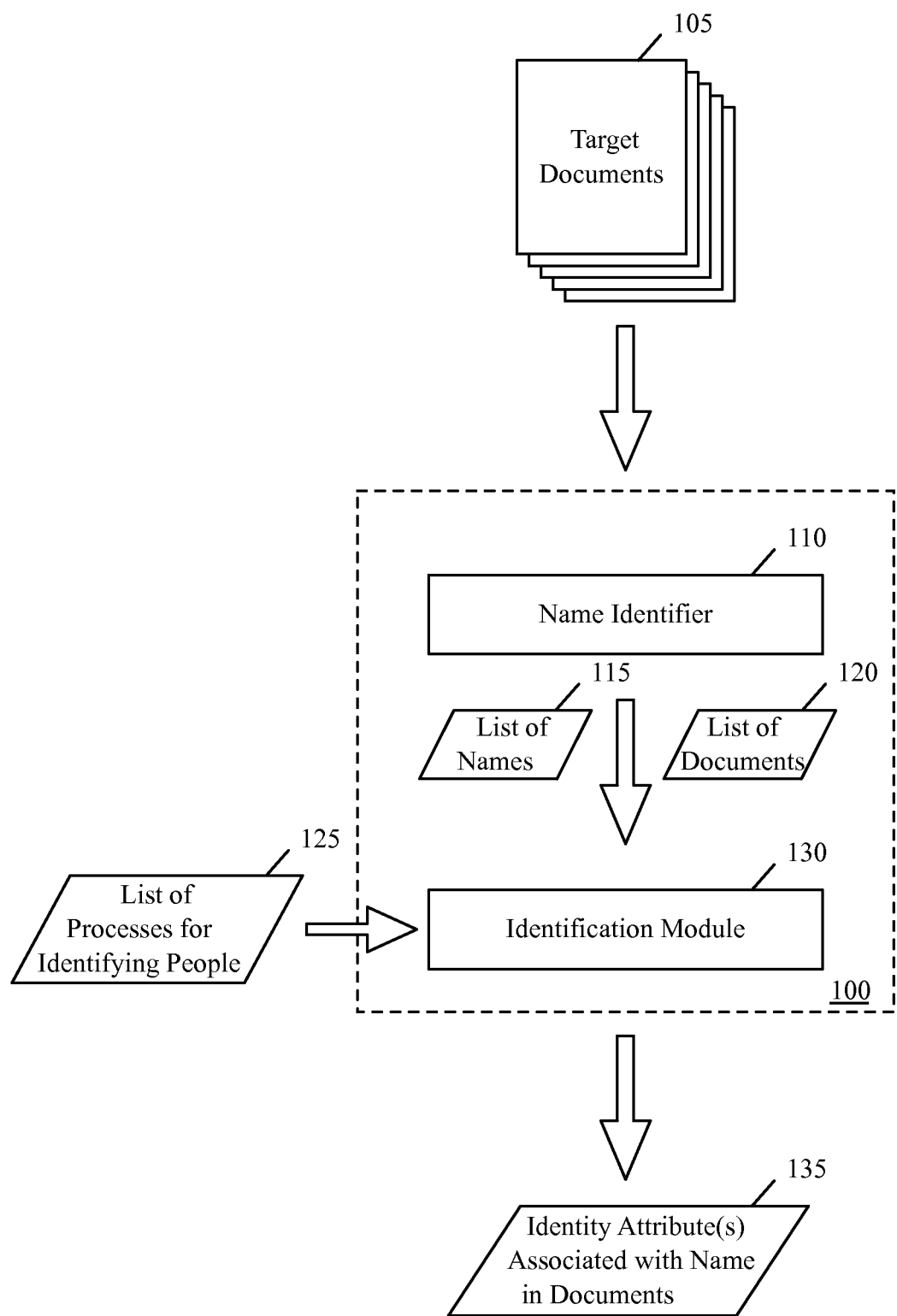
FIG. 1 conceptually illustrates an identification system of some embodiments.

FIG. 1 conceptually illustrates an identification system 100 of some embodiments that uses the method described above for identifying people based on names in documents. The identification system 100 includes a name identifier 110 and an identification module 130.

As shown, the system 100 receives a set of target documents 105 at the name identifier 110. The target documents 105 are documents that are filtered from a defined source of documents (e.g., documents on the Internet or documents stored in a database). For instance, the target documents 105 may be documents that are published (e.g., posted on the Internet) within a certain time period (e.g., the last 48 hours, a time period between two calendar dates, a particular calendar year, etc.). The target documents 105 might be documents that are identified as pertaining to a topic (e.g., economics, politics, religion, etc.), a company (e.g., Apple, Microsoft, General Motors, Chevron, etc.), a product (e.g., iPhone, PlayStation 3, Windows 7, etc.), an industry (e.g., banking, mobile telecommunications, automobiles, real estate, etc.), etc. Furthermore, the target documents 105 may be filtered by a combination of any number of the criteria mentioned above and/or other criteria by which the source of documents may be filtered. The name identifier 110 identifies a list of interesting names 115 that are specified in the target documents 105. Different embodiments define an interesting name differently. For instance, in some embodiments, an interesting name is a name that appears more than other names in the target documents 105. In some such embodiments, the name identifier 110 identifies a particular name that occurs in the target documents 105 as an interesting name when instances of the particular name occurs a threshold amount (e.g., 2, 3, 5, etc.) in the target documents 105. In some cases, an interesting name may be a name in a predefined list of names (e.g., a list of names stored in a file, a list of names retrieved from a database of names, etc.). In these cases, the name identifier 110 iterates through the predefined list to identify the names in the predefined list.

In some embodiments, the name identifier 110 also identifies a list of best documents 120 from the set of target documents 105. The list of best documents 120 includes a set of best documents for each interesting name. To identify a set of best documents for an interesting name, the name identifier 110 of some embodiments (1) identifies a number of instances of the interesting name that occur in each document in the target documents 105 and (2) identifies a defined number (e.g., 3) of documents with the most amount of instances of the interesting name. Thus, the best documents in such embodiments are the documents that contain the most occurrences of the interesting name compared to the other documents in the target documents 105.

As noted, the name identifier 110 may identify a set of best documents for an interesting name from the set of target documents 105, in some embodiments. However, in other embodiments, the name identifier 110 may identify the set of best documents for each name from a different source of documents. For example, the source of documents may be a subset of the set of target documents 105, a set of documents that includes other documents and some or all of the target documents 105, a set of documents that includes documents other than the target documents 105, etc.

The list of interesting names 115, the list of best documents 120, and a list of processes for identifying people are input to the identification module 130. The list of processes 125 of some embodiments each generates (1) a set of candidate identity attributes for an interesting name based on the interesting name and a best document and (2) a relevancy score for each candidate identity attribute. As described above, an identity attribute of some embodiments can include many different types of identity attributes (e.g., a name, a company, a title, an address, a social security number, an email address). As such, the set of candidate identity attributes generated by each process in the list of processes 125 may include different types of candidate identity attributes (e.g., company, title, etc.).

The list of processes 125 may include any number (e.g., 1, 2, 5, 10, 100, etc.) of processes. Different processes may use different techniques to generate a set of identity attributes for a name in a document. For instance, some processes may query a database that stores information about people (e.g., first name, last name, middle name, company, title, industry, address, telephone number, email address, etc.).

In some embodiments, a method references metadata associated with the content of a document in order to generate a set of identity attributes for a name in the document. The metadata of some embodiments is (1) extracted from the document during a pre-processing operation performed on the document and (2) stored in a database. Some such metadata indicates one or more categories (e.g., company, industry, people, topics, etc.) to which the document belongs. Other such metadata identifies one or more words in the document as entities (e.g., a company, a name of a person, etc.) and/or facts (e.g., a title of a person, an email address of a person, etc.). Other types of metadata may be extracted as well.

Alternatively, or in conjunction with metadata associated with content in the document, some processes analyze the content in the document in order to generate a set of candidate identity attributes for a name in the document. For instance, some such processes analyze the document using lexical analysis techniques. As another example, some processes search for keywords in the content of the document and/or the proximity (e.g., number of words) between the keywords.

Another technique for generating a set of identity attributes involves the system 100. In particular, a process in the list of processes 125 of some embodiments may use the system 100 as a technique for generating a set of candidate identity attributes since the output of the system 100 is a set of identity attributes (i.e., the set of identity attributes 135).

Moreover, different processes may generate different amounts of different types of candidate identity attributes. For instance, a process may generate only one candidate identity attribute of one type. Some processes may generate several identity attributes of a one type. Still, some processes may generate several identity attributes of several different types.

Many of the processes described above may be automated (e.g., does not require human intervention) processes, but some processes may be defined to include user interaction. For example, a process may involve (1) sending the name and the contents of the document to a computing device for display to a user of the computing device and (2) receiving selections (e.g., through a GUI) of candidate identity attributes from the user.

Several different techniques that different processes may use to identify a set of candidate identity attributes are discussed above. One of ordinary skill in the art will realize that other processes may use other techniques. Moreover, some processes may use a combination of the techniques described above (e.g., (1) referencing metadata associated with the document and (2) querying a people database) and/or other techniques.

As noted above, in some embodiments, each process in the list of processes 125 also generates a relevancy score for each candidate identity attribute that the process generated. A relevancy score of some embodiments is a value that represents a degree of correctness between a candidate identity attribute and the identity of a person who has the name in the document. In some embodiments, a higher relevancy score indicates a higher degree of relevance, while, in other embodiments, a lower relevancy score indicates a higher degree of relevance. In addition, different processes may generate relevancy scores that fall within different ranges of values. For example, some processes may generate relevancy scores that fall between values 0 and 1 (e.g., 0.1, 0.25, 0.5, 0.9, etc.). Other processes may generate relevancy scores that fall within any number of different ranges of values.

As mentioned above, each process in the list of processes 125 generates (1) a set of candidate identity attributes based on an interesting name and a best document for the interesting name and (2) a relevancy score for each candidate identity attribute. When the identification module 130 receives the list of processes 125, the identification module 130 of some embodiments (1) executes, or instructs a computing device to execute, each of the processes in the list of processes 125 and (2) retrieves the set of candidate identity attributes and corresponding relevancy scores generated by each process.

For an interesting name and a best document for the interesting name, the identification module 130 uses the results generated from the list of processes 125 (i.e., the sets of candidate identity attributes and relevancy scores) to identify a set of identity attributes 135 that identifies a person having the interesting name in the best document. For instance, the identification module 130 may identify the candidate identity attribute that has the highest relevancy score as the set of identity attributes 135.

In some embodiments, the identification module 130 identifies several candidate identity attributes as the set of identity attributes 135 for identifying a person having the interesting name in the best document. As discussed above, the set of candidate identity attributes generated by each process in the list of processes 125 may include different types of candidate identity attributes (e.g., company, title, etc.). For each particular type of candidate identity attribute generated by the processes, the identification module 130 of some embodiments identifies a candidate identity attribute of the particular type as an identity attribute in the set of identity attributes 135. Accordingly, the identification module 130 of some such embodiments processes the results generated from the list of processes 125 on an identity attribute type basis.

In some embodiments, the identification module 130 identifies the set of identity attributes 135 by generating a score for each identity attribute based on several criteria. As discussed above, different processes may generate relevancy scores across different ranges of values. Thus, when generating a score for a candidate identity attribute, the identification module 130 of some embodiments may consider a normalization factor that converts the relevancy score for the candidate identity attribute to a single range of values. In some embodiments, the normalization factor is associated with the process used to generate the candidate identity attribute.

Different processes may have different probabilities of producing candidate identity attributes that correctly identify a person. As such, the identification module 130 of some embodiments might consider a confidence factor when generating a score for a candidate identity attribute. In some embodiments, the confidence factor is a value provided by a third party (e.g., quality assurance testers, automated error tests, etc.) that represents a probability that a candidate identity attribute generated by a process based on a name in a document, correctly identifies the actual person referred to by the name in the document. Accordingly, a confidence factor is associated with the process used to generate the candidate identity attribute, in some embodiments.

Another criteria that the identification module 130 might consider when identifying an identity attribute of a certain type is the frequency of a word across all the words in the candidate identity attributes of the certain type. Several criteria for identifying an identity attribute have been described above. These criteria, as well as other criteria, will be described in further detail below.

The above section discusses different processes that each generates a set of candidate identity attributes and a relevancy score for each candidate identity attribute. In several embodiments described below, such processes are referred to as methods. However, one of ordinary skill in the art will realize that the processes may be any type of entity that performs a function and returns results (e.g., a web service, a remote procedure call (RPC), a script, a database query, etc.). In addition, much of this application describes details, examples, and embodiments related to identifying a person who has a name included in a document. However, other embodiments may identify people referenced in other types of content. For instance, some embodiments may identify people referred to in audio and/or video content (e.g., by using an audio to text converter).

Several more detailed embodiments of the invention are described in the sections below. Section I describes details of the identification of interesting names from a set of documents according to some embodiments, including the identification of a set of best documents for each identified interesting name. Section II describes details of the identification of identity attributes for the names in the best documents according to some embodiments. Section III describes an example system of some embodiments in which the interesting name identification and the identity attribute identification features are used. Finally, Section IV describes an electronic system with which some embodiments of the invention are implemented.

I. Identifying Interesting Names and Best Documents

As mentioned above, the method of some embodiments identifies a person based on a name in a document. Such a method may be used for many different purposes. For instance, users of the Internet may want to search for documents related to popular people in the news (e.g., people who recently have been mentioned an unusual amount on the Internet). Since many different people may share the same name or have similar names, the method may be applied to documents that mention the name of a popular person in order to verify that the documents are in fact referring to this person and not another person who has the same name or a similar name.

Figure 2:
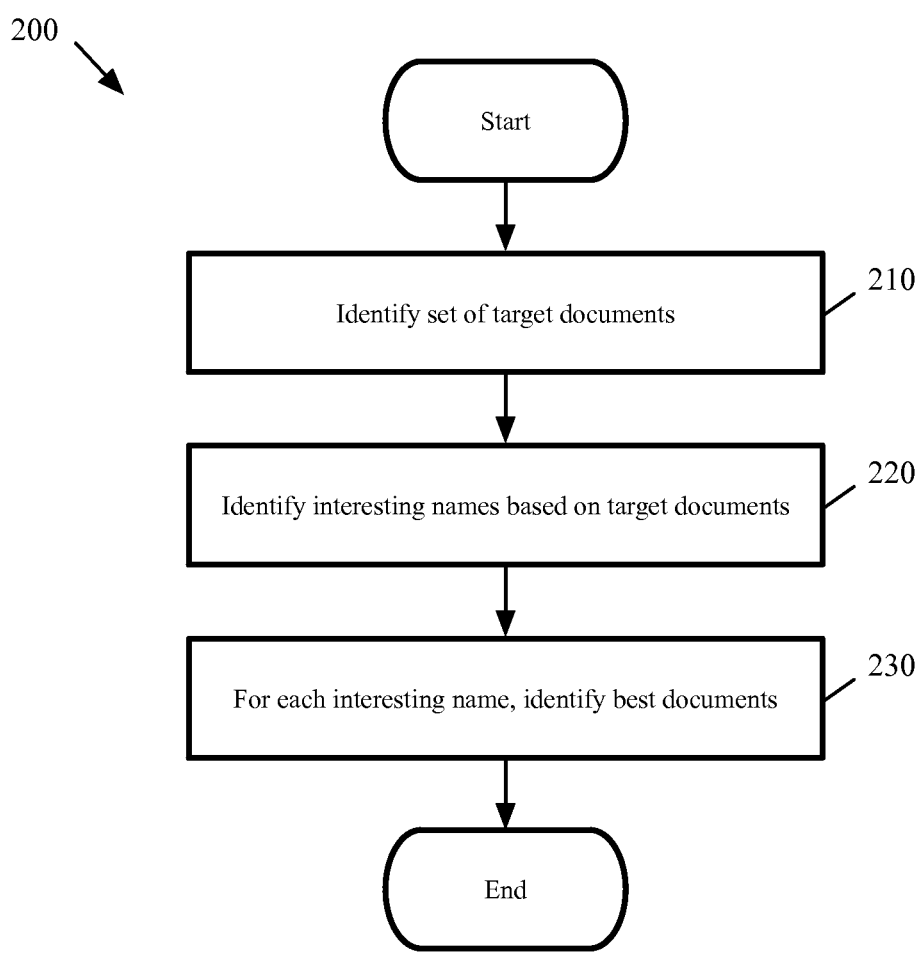
FIG. 2 conceptually illustrates a process of some embodiments for identifying interesting names and best documents.

FIG. 2 conceptually illustrates a process 200 of some embodiments for identifying interesting names and best documents that may be used as input to the method of some embodiments for identifying a person based on a name in a document. In some embodiments, the process 200 is performed by the name identifier 110, which is described above by reference to FIG. 1.

The process 200 starts by identifying (at 210) a set of target documents. As discussed above, the target documents of some embodiments are documents that are filtered from a defined source of documents. The target documents may be documents that are published within a certain time period, or documents that are identified as pertaining to a topic, company, product, industry, or a combination of any number of the criteria mentioned and/or other criteria by which the source of documents may be filtered.

Next, the process 200 identifies (at 220) a set of interesting names based on the set of documents. For this example, an interesting name is a name that occurs more than other names in the target documents. The process 200 of some embodiments identifies a name an interesting name when instances of the name that occurs a threshold amount (e.g., 2) in the target documents.

After identifying the set of interesting names, the process 200 identifies (at 230) a set of best documents for each interesting name in the set of interesting names. In some embodiments, the process 200 identifies the set of best documents for an interesting name by (1) identifying a number of instances of the interesting name that occur in each target document and (2) identifying a defined number (e.g., 3) of target documents with the most amount of instances of the interesting name as the set of best documents for the interesting name.

The rest of this Section discusses additional details, examples, and embodiments of an interesting name identification feature and a best document identification features that are used in a system of some embodiments for identifying a person based on a name in a document. In particular, subsection A describes details of the interesting name identification feature, subsection B describes details of the best document identification feature, and subsection C describes an example software architecture of a module that includes both of these features.

A. Identifying Interesting Names

As explained above, the system of some embodiments (1) identifies names in a set of target documents in order to identify, from the identified names, a set of interesting names in the set of target documents. In some embodiments, the system uses another set of documents as a reference point from which to identify interesting names in the set of target documents. This other set of documents is referred to as a set of background documents.

Figure 3:
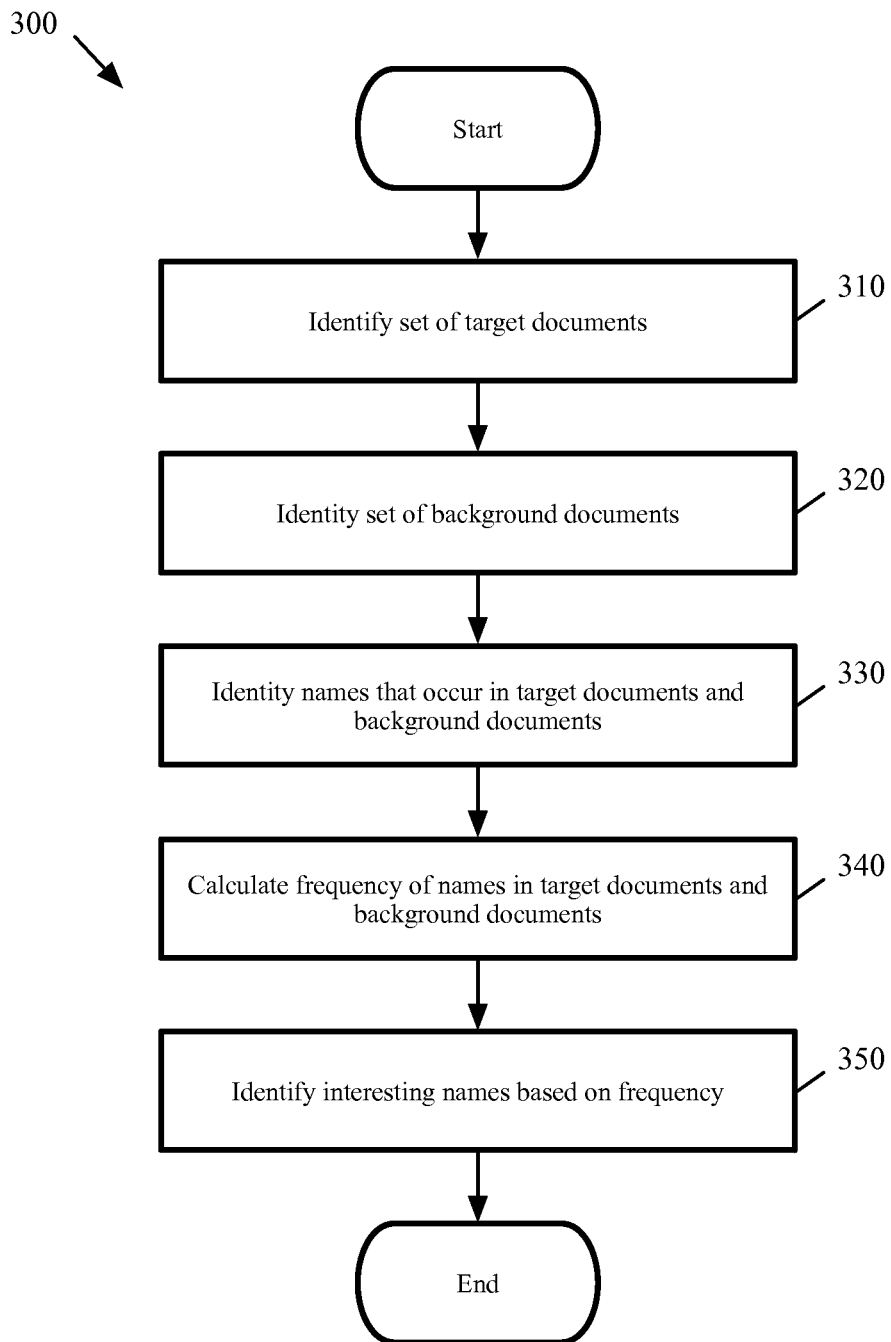
FIG. 3 conceptually illustrates a process of some embodiments for identifying interesting names based on a set of target documents and a set of background documents.

FIG. 3 conceptually illustrates a process 300 of some embodiments for identifying interesting names based on a set of target documents and a set of background documents. In some embodiments, the process 300 is performed by the name identifier 110, which is described above by reference to FIG. 1. Additionally, the process 300 of some embodiments is an automated process that is performed without human intervention.

The process 300 begins by identifying (at 310) a set of target documents. In some embodiments, the set of target documents are the same as the set of target documents 105, which are described above by reference to FIG. 1. That is, the target documents are documents that are filtered from a source of documents based on a set of criteria (e.g., time period, topic, company, product, industry, etc.)

Next, the process 300 identifies (at 320) a set of background documents. In some embodiments, process 300 identifies the set of background documents in a similar manner as identifying the set of target documents except that process 300 identifies the set of background documents to include the set of target documents as well as additional documents. In other words, the process 300 uses a broader filter than that used to identify the set of target documents from a source of documents. For instance, the process 300 may (1) identify the set of target documents as documents that have been published on the Internet within the last 48 hours and (2) identify the set of background documents as documents that have been published on the Internet within the last 2 weeks. The process 300 of some embodiments identifies the set of background documents from the source of documents in any number of different ways (e.g., documents other than the set of target document or documents that include only a portion of the set of target documents).

The process 300 then identifies (at 330) names that occur in the set of target documents and names that occur in the set of background documents. In some embodiments, the source of documents from which the process 300 identifies the set of target documents and the set of background documents has been pre-processed to extract various information (e.g., represented by metadata), including sets of words that are identified as names. In some embodiments, the process 300 identifies the names that occur in the set of target documents and the set of background documents by accessing such information (e.g., by querying a database in which the information is stored).

Once the names in the documents are identified, the process 300 calculates (at 340) the frequency (e.g., the number of instances) of the same name or a similar name that appears in the set of target documents for each different name in the set of target documents. The process 300 also calculates the frequency of the same name or a similar name that appears in the set of background documents for each different name in the set of background documents. Based on the calculated frequencies of different names, the process 300 identifies (at 350) a set of interesting names. The process 300 of some embodiments identifies an interesting name by (1) identifying names that appears a threshold amount (e.g., 2, 3, 5, etc.) in each of the sets of target and background documents, (2) comparing the calculated frequency of the names that appear in the set of target documents with the frequency of the corresponding names in the set of background documents, and (3) identifying the names with a frequency in the set of target documents that is greater by a threshold amount than the frequency in the set of background documents. In this manner, a name that appears more in the set of target documents relative to the set of background documents is identified as an interesting name. Thus, popular names that consistently appear often in documents are not identified as interesting names. However, these names may still be identified as interesting names, but only when such names appear more often than usual in the set of target documents compared to the set of background documents.

B. Identifying Best Documents

In addition to identify interesting names, the system of some embodiments, as described above, identifies a set of best documents for each interesting name from a defined set of documents (e.g., the set of target documents). Different embodiments use different techniques to identify the set of best documents for each interesting name. For instance, some embodiments identify the best documents for an interesting name based on (1) the frequency that the interesting name occurs in the defined set of documents and (2)

the locations in the defined set of documents (e.g., top, middle, bottom, left, right, etc.) at which the instances of the interesting name occurs.

Figure 4:
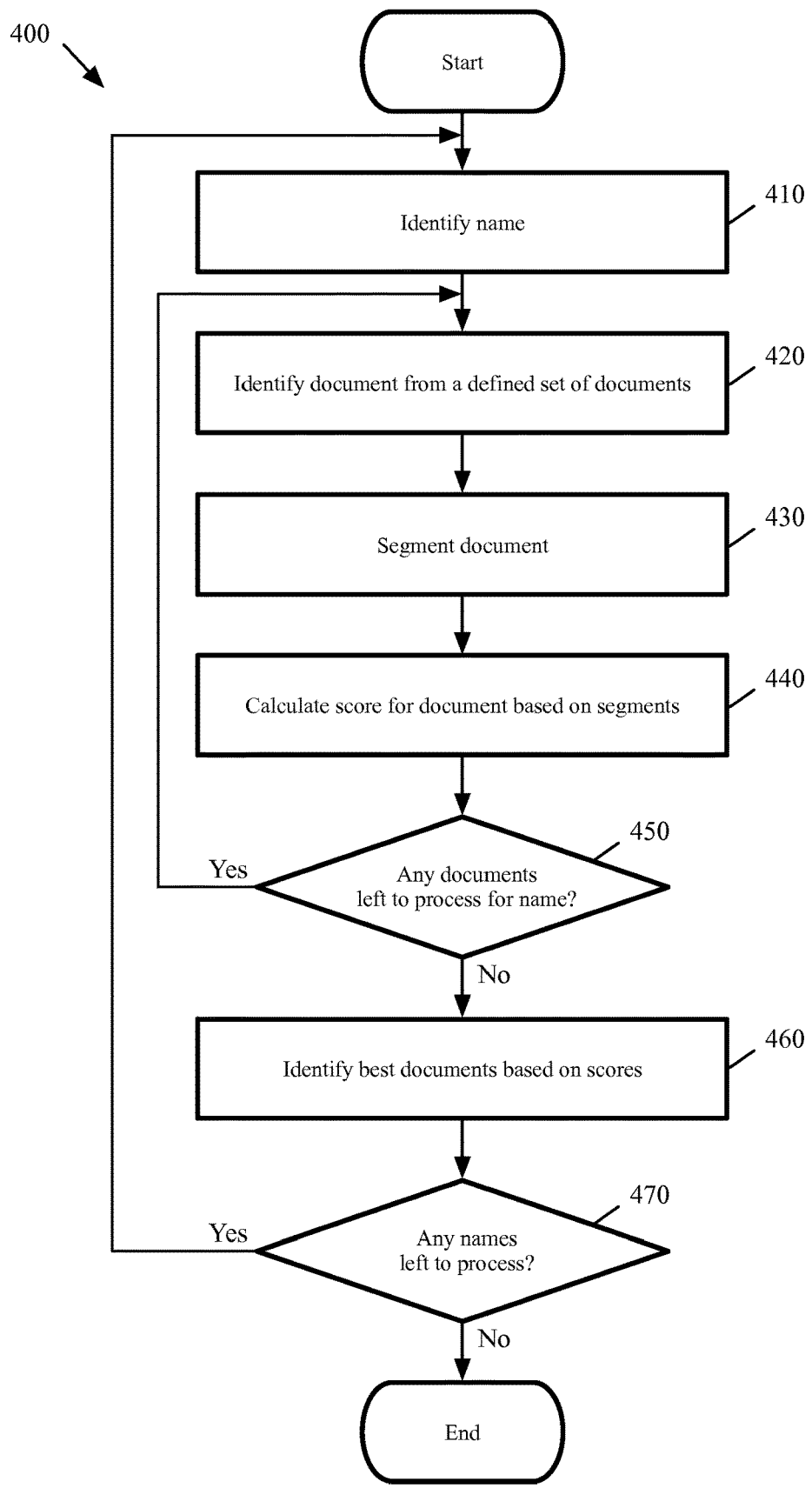
FIG. 4 conceptually illustrates a process of some embodiments for identifying sets of best documents for interesting names.

FIG. 4 conceptually illustrates a process 400 of some embodiments that employs such a technique for identifying sets of best documents for interesting names. In some embodiments, the process 400 is performed by the name identifier 110 that is described above by reference to FIG. 1. Additionally, the process 300 of some embodiments is an automated process that is performed without human intervention In some embodiments, the process 300 and the process 400 are concatenated into one automated process. For these embodiments, the set of interesting names identified by the process 300 and a set of documents (e.g., the set of target documents) are received as input to the process 400 and subsequently performed as described below.

The process 400 starts by identifying (at 410) a name from a set of interesting names. In some embodiments, the set of interesting names is identified using the process 300 described above by reference to FIG. 3.

Next, the process 400 identifies (at 420) a document from a defined set of documents. Different embodiments define the defined set of documents differently. In some embodiments, the defined set of documents is the set of target documents that are used to identify the interesting names. Instead of the set of target documents, the defined set of documents of some embodiments is a different set of documents. For example, the defined set of documents of some such embodiments is the set of background documents, a set of documents that includes documents other than the set of target documents, a set of documents that includes a portion of the set of target documents and additional documents, or any other set of documents.

The process 400 then segments (at 430) the identified document into several sections. Different embodiments segment the identified document differently. For instance, the process 400 of some embodiments segments the document into several horizontal sections. In some embodiments, the process 400 segments the document into quadrant sections. Other ways of segmenting the document are possible (e.g., vertical sections). Some embodiments may identify the title portion of the document as one of the several sections. Because different documents may be formatted differently, the process 400 of some embodiments retrieves a document definition (e.g., from a database) that specifies the format of the identified document in order to segment the identified document. A document definition of some embodiments also specifies the manner in which to segment the identified document.

After segmenting the identified document, the process 400 calculates (at 440) a score for the document based on the segments. In some embodiments, the process 400 calculates the score for the document by (1) parsing the document for instances of the interesting name, (2) assigning values to each instance of the interesting name in the document based on the section in which the name is located in the document, and (3) calculating a sum of the values. In other words, the score calculated for the document by the process 400 of such embodiments is a weighted sum of values assigned to instances of the interesting name in the segmented document. Some embodiments assign more weight to instances of interesting names that occur earlier in the document (e.g., instances in a title section is assigned more weight than a section that includes a first page, instances in the section that includes the first page is assigned more weight than a section that includes a second page, instances in the section that includes the second page is assigned more weight than a section that includes a third page, etc.). Other methods for calculating a score for the segmented document are possible (e.g., calculating a weighted average) in other embodiments.

Figure 5:
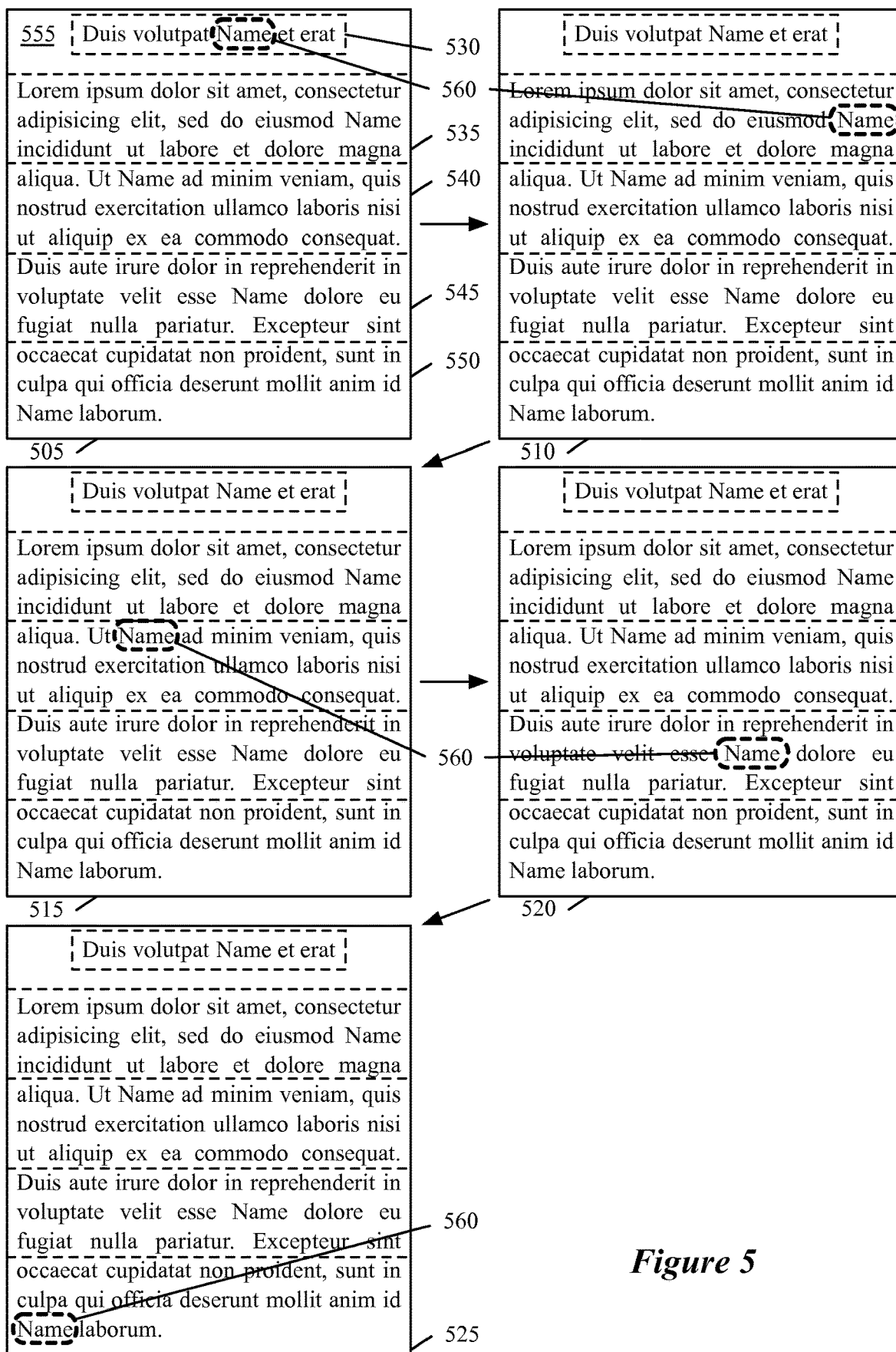
FIG. 5 conceptually illustrates an example of a segmented document and names identified in the document.

FIG. 5 conceptually illustrates an example of a segmented document 555 and instances of name 560 identified in the document. Specifically, FIG. 5 conceptually illustrates the document 555 at five different stages 505-525 of a score calculation operation. As shown, the document 555 is segmented into five sections 530-550. The section 530 is the portion of the document 555 that includes the title, the section 535 is the top portion of the document 555, the section 540 is the top-middle portion of the document 555, the section 545 is the bottom-middle portion of the document 555, and the section 550 is the bottom portion of the document 555. In some embodiments, the segmentation and score calculation operation are performed by the process 400 (e.g., at operations 435 and 440).

As noted above, instances of the interesting name located in different sections of a document are assigning different values. In this example, instances of the name 560 in the section 530 are assigned a value of 1.2, instances of the name 560 in the section 535 are assigned a value of 1.1, instances of the name 560 in the section 540 are assigned a value of 1.0, instances of the name 560 in the section 545 are assigned a value of 0.9, and instances of the name 560 in the section 550 are assigned a value of 0.8.

At the first stage 505, the section 530 has been parsed and an instance of the name 560 has been identified and assigned a value of 1.2. In the second stage 510, the section 535 of the document 555 has been parsed and an instance of the name 560 has been identified and assigned a value of 1.1. At this stage, the score for the document is 2.3.

At the third stage 515 of the score calculation operation, the section 540 has been parsed and one instance of the name 560 has been identified. This instance is assigned a value of 1.0. Next, the fourth stage 520 shows that the section 545 of the document 555 has been parsed and an instance of the name 560 has been identified. This instance of the name 560 is assigned a value of 0.9. The score for the document at this stage is 4.2.

Finally, at the fifth stage 525, the section 550 has been parsed and an instance of the name 560 has been identified. The value assigned to this instance of the name 560 is 0.8. Thus, the total score for the document 555 is 5.0.

Returning to FIG. 4, the process 400 determines (at 450) whether there is any document in the defined set of documents left to process. When the process 400 determines that there is a document left to process, the process 400 returns to operation 420 to continue processing any remaining documents in the defined set of documents. Otherwise, the process 400 continues to operation 460.

At 460, the process 400 identifies the best documents for the interesting name based on the calculated scores. The process 400 of some embodiments identifies a predefined number (e.g., 3) of documents that have the highest scores compared to the other documents in the set of defined document as the best documents for the interesting name.

Finally, the process 400 determines (at 470) whether any name in the set of interesting names is left to process. When the process 400 determines that there is a name left to process, the process 400 returns to operation 410 to continue processing any remaining names in the set of interesting names. When the process 400 determines that there is no name left to process, the process 400 ends.

Figure 6:
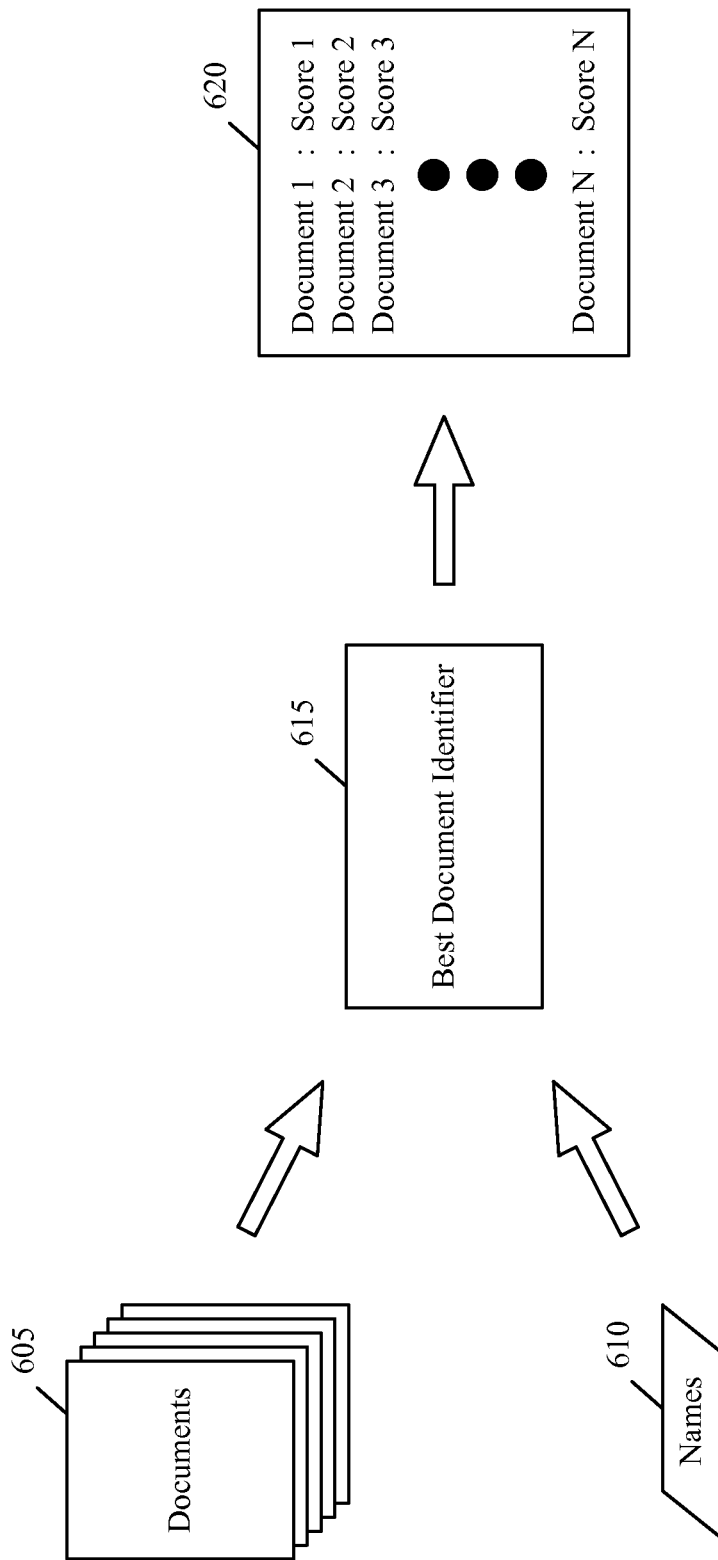
FIG. 6 conceptually illustrates the input and output of a best document identifier of some embodiments.

FIG. 6 conceptually illustrates the input and output of a best document identifier 615 of some embodiments. As illustrated in FIG. 6, a set of documents 605 and a set of names 610 are input to the best document identifier 615. In some embodiments, the set of names 610 are interesting names and the set of documents 605 are the set of documents that were used to identify the interesting names. The best document identifier 615 (1) calculates a score for each document in the set of documents 605 based on a name in the set of names 610 and (2) identifies a set of best documents from the set of documents 605 based on the scores. As shown, the best document identifier 615 outputs the set of best documents and their corresponding scores 620. In some embodiments the best document identifier 615 performs the process 400 to identify the set of best documents for the name in the set of names 610.

Figure 7:
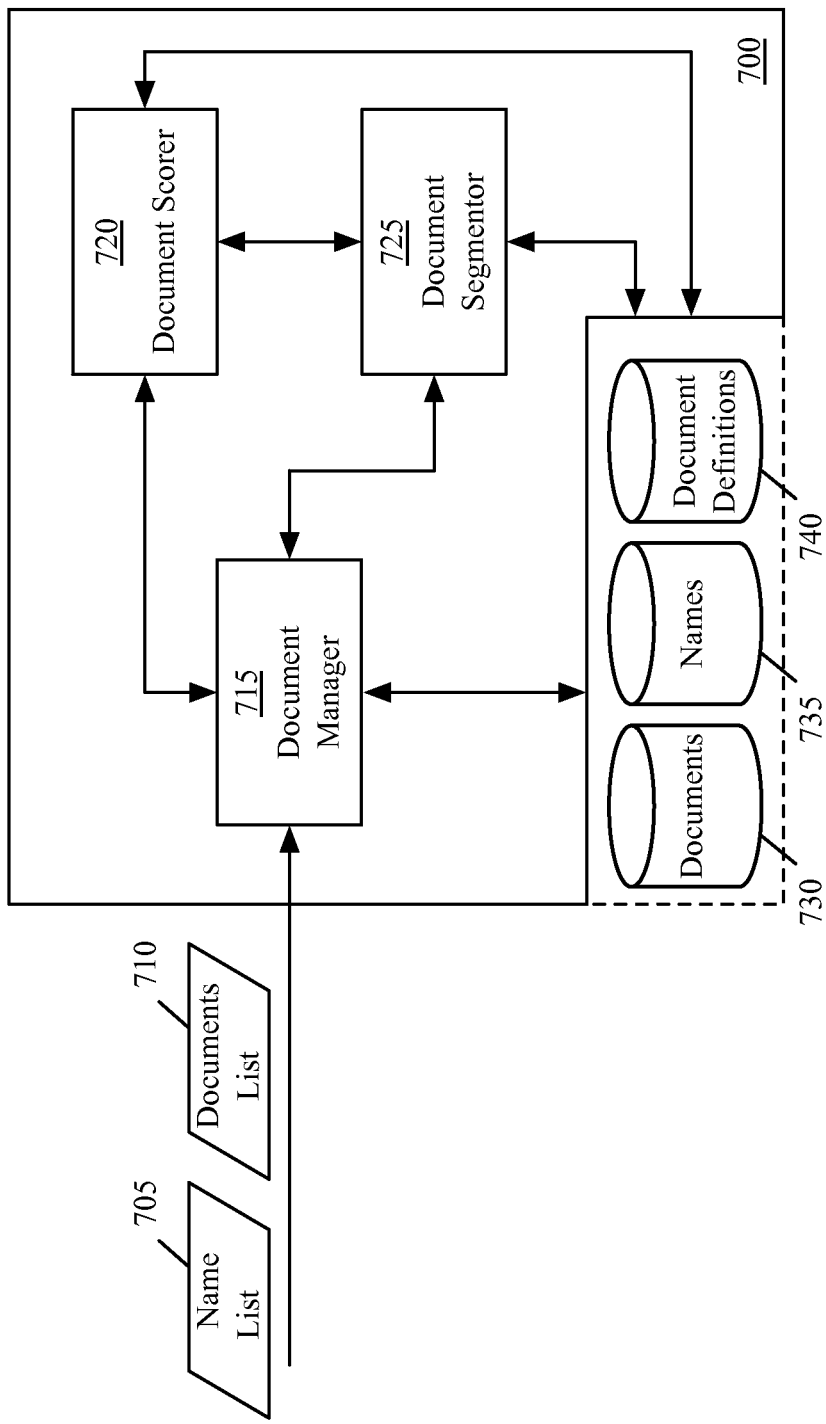
FIG. 7 conceptually illustrates a software architecture of a best document identifier of some embodiments.

FIG. 7 conceptually illustrates a software architecture of a best document identifier 700 of some embodiments. In some embodiments, the best document identifier 700 is a module that receives a set of documents and a name and outputs a set of best documents based on the name, as illustrated in FIG. 6. The best document identifier 700 of some embodiments performs the process 400, which is described above by reference to FIG. 4, to identify a set of best documents for a name.

As shown, the best document identifier 700 includes a document manager 715, a document scorer 720, and a document segmentor 750, documents storage 730, names storage 735, and document definitions storage 740. In some embodiments, the storages 730-740 are one physical storage while, in other embodiments, the documents, the names (which include interesting names), and document definitions are stored in separate physical storages.

The document manager 715 receives a name list 705 and a document list 710 that the document manager 715 uses to retrieve names from the names storage 735 and documents from the documents storage 7a30. In some embodiments, the name list 705 is a list of interesting names. The document list 710, in some embodiments, specifies the set of documents (e.g., target documents) that were used to identify the interesting names in the name list 705.

In addition to retrieving the documents and the names, the document manager 715 identifies a set of best documents for each name in the name list 705. To identify a set of best documents for a name in the name list 705, the document manager 715 sends the documents in the document list 710 and the name to the document scorer 720 to calculate scores for the documents. When the document manager 715 receives the scores for each of the documents from the document scorer 720, the document manager 715 identifies a defined number (e.g., 3) of documents in the document list 710 with the highest scores as the set of best documents for the name.

The document scorer 720 receives a set of documents and a name, and calculates a score for each of the documents based on the name. In some embodiments, the document scorer 720 scores each document by (1) segmenting the document, (2) parsing the document for instances of the name, (3) assigning values to each instance of the interesting name in the document based on the section in which the name is located in the documents, and (4) calculating a sum of the values. To segment a document, the document scorer 720 of some embodiments sends the document to the document segmentor 725 to segment.

In some embodiments, the document segmentor 725 (1) receives a document from the document scorer 720, (2) segments the document (e.g., indicated using metadata), and (3) sends the segmented document back to the document scorer 720. To segment a particular document, the document segmentor 725 of some embodiments accesses document definitions storage 740 for a document definition associated with the particular document. The document definition specifies the format of the particular document and, in some cases, specifies the manner in which to segment the particular document. Alternatively, or in conjunction with receiving documents from the document scorer 720, the document segmentor 725 may receive documents from the document manager and segment such documents in the same manner described above.

The operation of the best document identifier 700 will now be described. The document manager 715 receives the name list 705 and the document list 710. Based on these lists, the document manager 715 retrieves a set of names from the names storage 735 and a set of documents from the documents storage 730.

After retrieving the names and the documents, the document manager 715 sends the set of documents and a name in the set of names to the document scorer 720 to calculate a score for each document. In some embodiments, the document manager 715 (1) sends the documents to the document segmentor 725 to segment each of the documents and (2) sends the segmented documents to the document scorer 720 along with the name.

When the document scorer 720 receives the set of documents and a name in the set of names from the document manager 7515, the document scorer 720 calculates a score for each of the documents. In embodiments where the documents scorer 720 receives documents from the document manager 715 that are not segmented, the document scorer 720 sends the documents to the document segmentor 725 to segment the documents. Once the document scorer 720 has calculated the scores for each document in the set of documents, the document scorer 720 sends the scores for the documents back to the document manager 715.

Upon receiving the scores for the documents from the document scorer 720, the document manager 715 identifies the best documents for the name. In some embodiments, the document manager 715 identifies a defined number (e.g., 3) of documents in the document list 710 with the highest scores as the set of best documents for the name. The document manager 715 iteratively sends the set of documents and a name in the set of names to the document scorer 720 and identifies the set of best documents for the name until all the names in the set of names have been processed.

C. Example Name Identifier

The subsections above discuss (1) the interesting name identification features and (2) the best document identification feature. In some embodiments, a single module may include both of these features. The following figures will describe details of such a module that includes both of these features.

Figure 8:
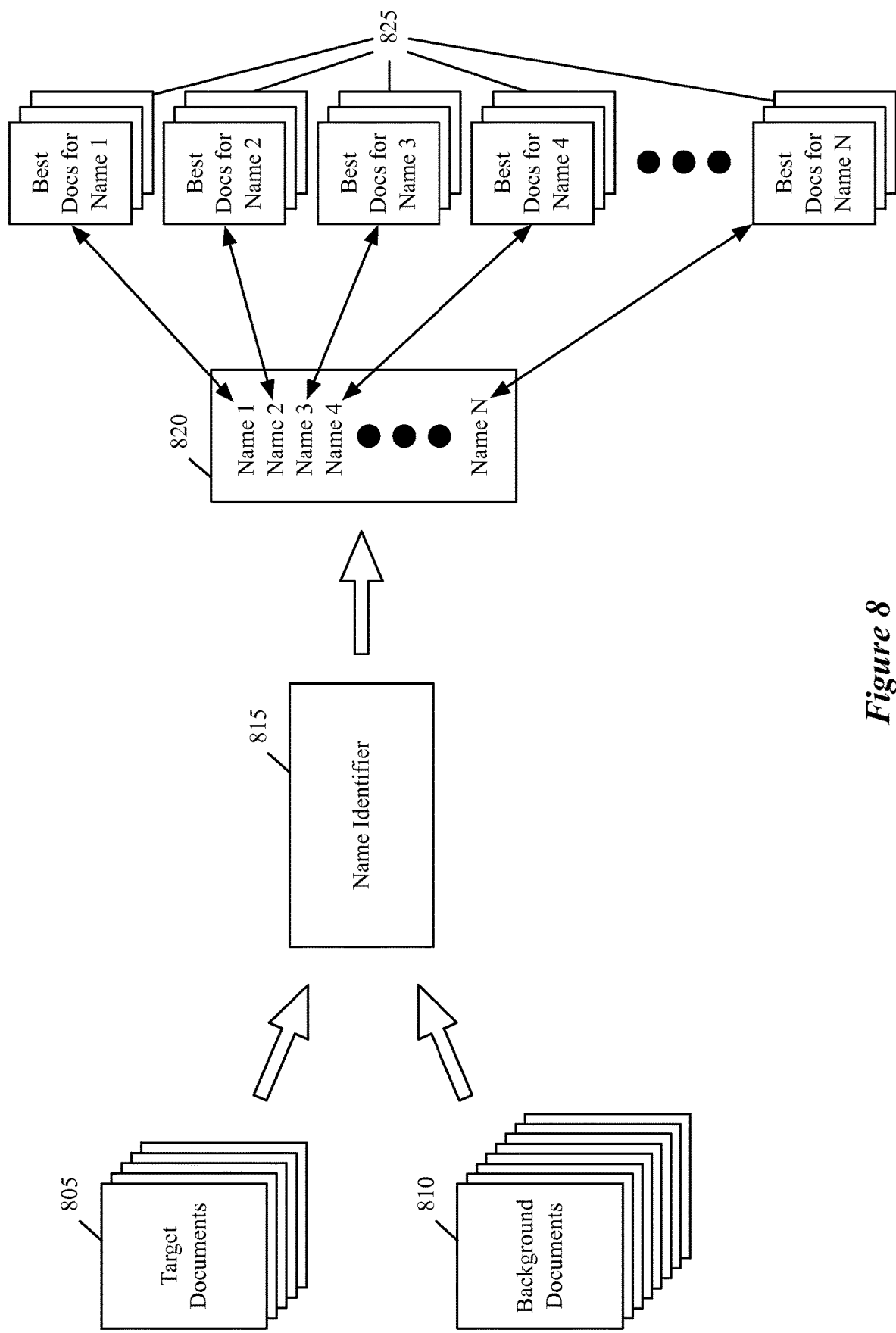
FIG. 8 conceptually illustrates the input and output of a name identifier of some embodiments.

FIG. 8 conceptually illustrates the input and output of a name identifier 815 of some embodiments. In some embodiments, the name identifier 815 is the name identifier 110 described above by reference to FIG. 1. As shown, a set of target documents 805 and a set of background documents 810 are input to the name identifier 815. In some embodiments, the name identifier 815 (1) performs the process 300 to identify a set of interesting names 820 and (2) performs the process 400 to identify a set of best documents 825 for each of the interesting names. As shown, the output of the name identifier 815 is a set of interesting names 820 and several sets of best documents 825. Each set of best documents 825 is associated with a corresponding name in the set of interesting names 820.

Figure 9:
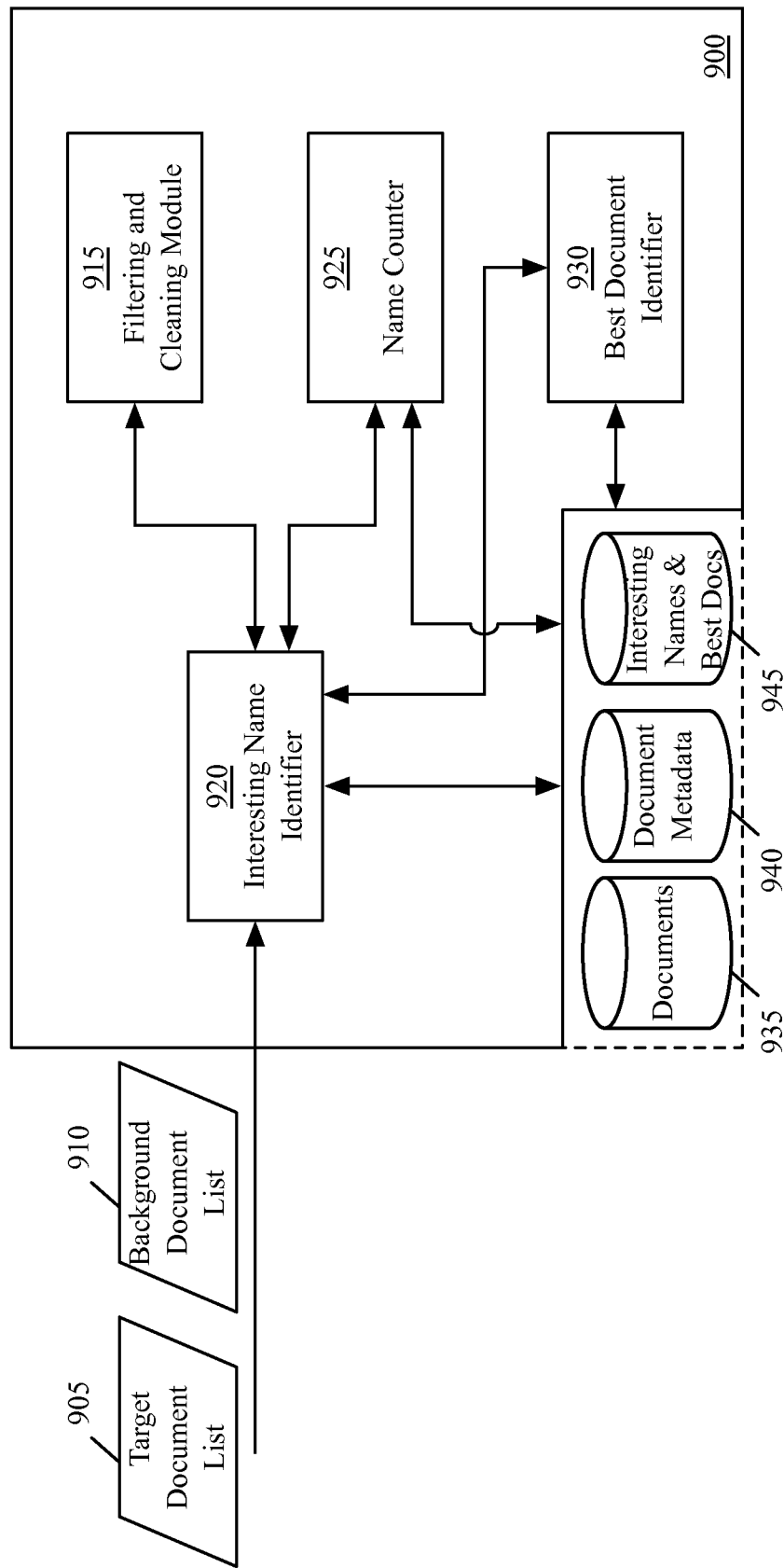
FIG. 9 conceptually illustrates a software architecture of a name identifier of some embodiments.

FIG. 9 conceptually illustrates a software architecture of a name identifier 900 of some embodiments. The name identifier 900 of some embodiments is a module that receives a set of target documents and set of background documents an outputs a set of interesting names and a set of best documents for each interesting name, as illustrated in FIG. 8. In some embodiments, the name identifier 900 (1) performs the process 300 to identify a set of interesting names and (2) performs the process 400 to identify a set of best documents for each of the interesting names.

The name identifier 900 includes an interesting name identifier 920, a filtering and cleaning module 915, a name counter 925, a best document identifier 930, a documents storage 935, a document metadata storage 940, and a interesting names and best documents storage 945. In some embodiments, the storages 935-945 are one physical storage while, in other embodiments, the documents, document metadata, and interesting names and best documents are stored in separate physical storages.

As shown, the interesting name identifier 920 receives a target document list 905 and a background document list 910. The interesting name identifier 920 retrieves the corresponding documents from the documents storage 935. In some embodiments, the lists 905 and 910 are expressed in terms of search queries (e.g., keyword search queries) that are used to filter through the documents in the documents storage 935. Based on the retrieved target documents and the background documents, the interesting name identifier 920 identifies a set of interesting names. In some embodiments, the interesting name identifier 920 identifies the set of interesting names by performing the process 300, which is described above by reference to FIG. 3. After identifying the set of interesting names, the interesting name identifier 920 of some embodiments stores them in the interesting names and best documents storage 945.

In some embodiments, the documents stored in the documents storage 935 have been pre-processed to extract various information (e.g., represented by metadata) including sets of words that are identified as names. The extracted information in these embodiments is stored in the document metadata storage 940. The interesting name identifier 920 of some embodiments retrieves metadata from the document metadata storage 940 to identify the set of interesting names.

The filtering and cleaning module 915 is responsible for removing, replacing, and/or modifying characters and/or words in a name. Examples of some such cleaning operations include replacing defined characters (e.g., "\", "/", etc.) with a space, removing prefixes (e.g., "Mr.", "Dr.", "Ms.", "Mrs.", etc.) from names, etc. In addition, the filtering and cleaning module 915 filters out names. Examples of some such filtered out names include single word names (e.g., partial names), names that contain more than a defined threshold amount of words (e.g., 4), names that include single character last names, names of deceased people, names of companies, names of places, names of objects, names specified in a defined list of names, etc. Different embodiments of the filtering and cleaning module 915 may define any number of rules for cleaning and filtering out names differently.

The name counter 925 (1) receives a document from the interesting name identifier 920, (2) identifies the instances of names in the document, and (3) calculates the sum of the instances of the same name or a similar name in the document. In some embodiments, the name counter 925 accesses metadata stored in the document metadata storage 940 to facilitate counting of names in the document. For instance, metadata for a particular document that is stored in the document metadata storage 940 indicates the sets of words that are identified as names in the particular document.

The best document identifier 930 receives a set of documents and a set of interesting names from the interesting name identifier 920. Based on the set of interesting names, the best document identifier 930 identifies a set of best documents from the received set of documents for each name in the set of interesting names. In some embodiments, the best document identifier 930 performs the process 400, which is described above by reference to FIG. 4, to identify the sets of best documents. After identifying the sets of best documents, the best document identifier 930 of some embodiments stores them in the interesting names and best documents storage 945.

The operation of the name identifier 900 will now be described. The interesting name identifier 920 receives the target document list 905 and the background document list 910. The interesting name identifier 920 uses the lists 905 and 910 to retrieve the corresponding documents from the documents storage 935. Based on the target and background documents, the interesting name identifier 920 identifies a set of interesting names in the target documents. To identify the set of interesting names, the interesting name identifier 920 may send the target and background documents to the name counter 925 to count the instances of the same name or a similar name across each set of documents. Based on the number of instances of different names, the interesting name identifier 920 identifies as interesting names the names that have a greater number of instances in the set of target documents than the number of instances in the set of background documents by a threshold amount.

In some embodiments, the interesting name identifier 920 (1) sends the names in the target and background documents to the filtering and cleaning module 915 for cleaning and filtering and (2) identifies the set of interesting names based on the cleaned and filtered names. Alternatively or in conjunction with cleaning and filtering the names before identifying the set of interesting names, the interesting name identifier 920 of some embodiments (1) identifies the set of interesting names and then (2) sends the set of interesting names to the filtering and cleaning module 915 for cleaning and filtering.

When the filtering and cleaning module 915 receives a set of names (the names in the target and background documents or the set of interesting names), it removes, replaces, and modifies words in the names based on a defined set of cleaning rules. Additionally, the filtering and cleaning module 915 filters out names from the set of names according to a set of filtering rules.

Once the interesting name identifier 920 has identified the set of interesting names, it sends the set of interesting names and the target documents (or another set of documents in some embodiments) to the best document identifier 930. In some embodiments, the interesting name identifier 920 also stores the set of interesting names in the interesting names and best documents storage 945.

When the best document identifier 930 receives the set of interesting names and the target documents from the interesting name identifier 920 (or retrieves them from the interesting names and best documents storage 945), the best document identifier 930 identifies a set of best documents from the target documents for each name in the set of interesting names. In some embodiments, the set of best documents for an interest name is a defined number (e.g., 3) of documents with the most amount of instances of the interesting name. After identifying the set of best documents, the best document identifier 930 of some embodiments stores them in the interesting names and best documents storage 945.

II. Identifying Identity Attributes for a Name in a Document

The previous section described identifying names that are mentioned an unusual amount in a set of documents and identifying the best documents from the set of documents for each name (e.g., documents in which the name occurs the most compared to other documents). In some embodiments, the identified names and the sets of best documents for the names are input to an identification module that identifies people who have the names that occur in the best documents.

Figure 10:
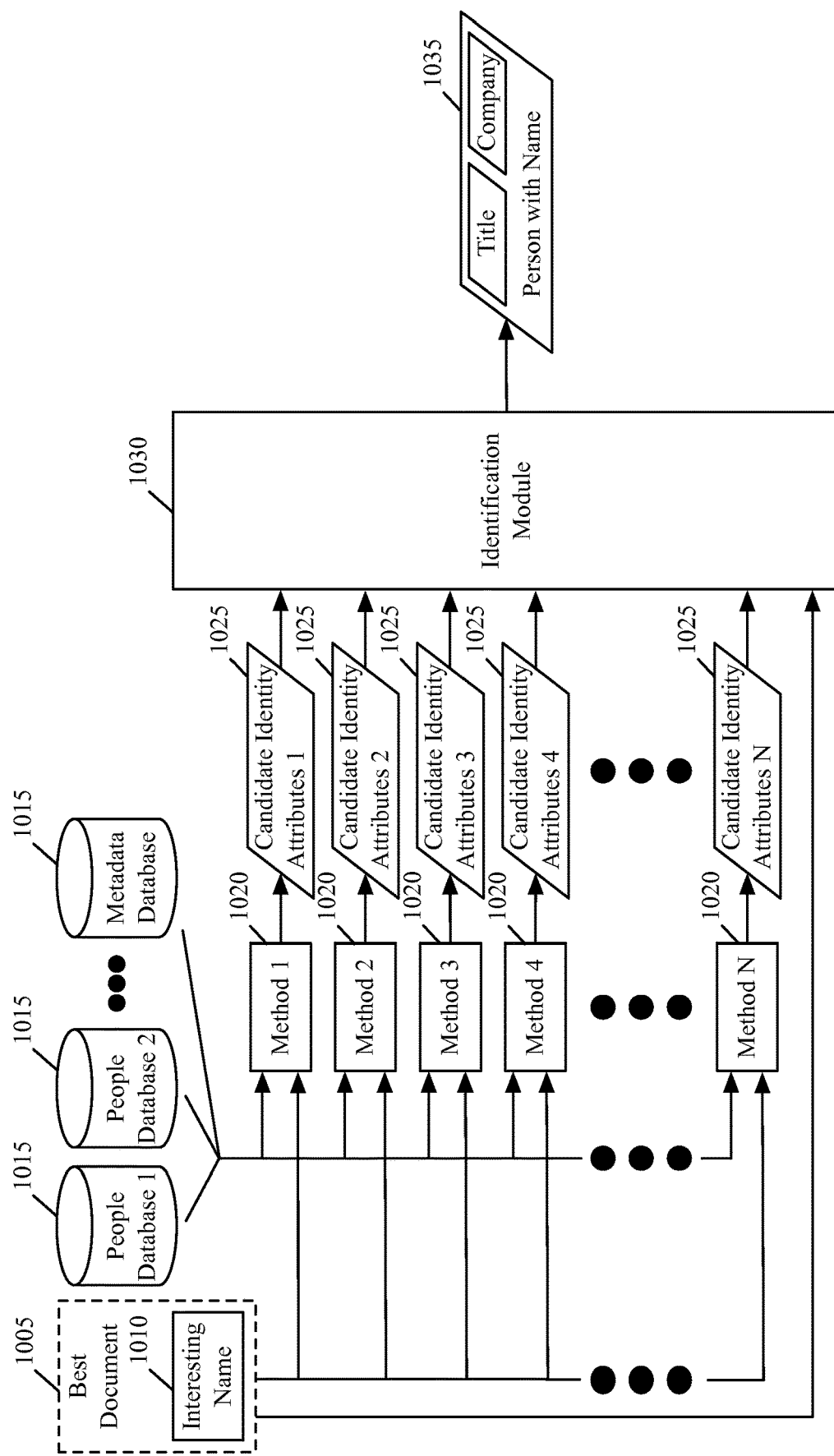
FIG. 10 conceptually illustrates an identification module of some embodiments.

FIG. 10 conceptually illustrates an identification module 1030 of some embodiments that identifies a person who has an interesting name 1010 in a best document 1005. As shown, FIG. 10 depicts the best document 1005, the interesting name 1010 in the best document 1005, databases 1015, methods 1020, sets of candidate identity attributes 1025, the identification module 1030, and title and company identity attributes 1035.

In some embodiments, the interesting name 1010 is identified (e.g., by the process 300 described above by reference to FIG. 3) as a name in a set of documents that occurs more often than other names in the set of documents. Additionally, the best document 1005 of some embodiments is a document that is identified (e.g., by the process 400 described above by reference to FIG. 4) from a set of documents (e.g., target documents) that was used to identify the interesting name 1010.

The people databases 1 and 2 are databases that store information about people (e.g., first name, last name, middle name, company, title, industry, address, telephone number, email address, etc.). Each of the people databases 1 and 2 may be a database of information about known or popular people provided by a third party, a database populated with information obtained by searching company management webpages, a database populated with information related to management turnover references in press releases, or any other type of database that contains information about people. While FIG. 10 illustrates only two people databases, one of ordinary skill in the art will realize that additional and/or different people databases may be used.

In some embodiments, the metadata database stores metadata associated with the best document 1005 that was extracted when the best document 1005 was pre-processed. Examples of such metadata includes metadata that indicates one or more categories (e.g., company, industry, people, topics, etc.) to which the best document 1005 belongs, metadata that identifies one or more words in the best document 1005 as entities (e.g., a company, a name of a person, etc.) and/or facts (e.g., a title of a person, an email of a person, etc.), among other metadata associated with the best document 1005.

As shown in FIG. 10, each method 1020 receives the best document 1005 and the interesting name 1010 as input. The methods 1020 in this example are different methods that each generates (1) a set of candidate identity attributes 1025 and (2) a relevancy score for each candidate identity attribute (not shown). As noted above, in some embodiments, an identity attribute is an attribute used for identifying a person. Also, a relevancy score of some embodiments is a value that represents a degree of correctness between a candidate identity attribute and the identity of a person who has the same name or a similar name in the document. Each of the methods 1020 may use different techniques for generating a set of identity attributes 1025 for the interesting name 1010 in the best document 1005. For instance, some methods 1020 may access query one or more of the database 1015 for information that is used to generate a set of candidate identity attributes. A method 1020 may query the people database 1 and/or 2 for persons that (1) have the same name or a similar name as the interesting name 1010 and (2) is associated with a company that occurs in the best document 1005. Another method 1020 may query the people database 1 and/or 2 for persons that (1) have the same name or a similar name as the interesting name 1010 and (2) is associated with a company in the same industry as the industry in which the best document 1005 is categorized. Yet another method 1020 may query the people database 1 and/or 2 for persons that (1) have the same name or a similar name as the interesting name 1010 and (2) is associated with a segment or sector in the same segment or sector as that in which the best document 1005 is categorized. Still another method 1020 may query the people database 1 and/or 2 for persons that (1) have the same name or a similar name as the interesting name 1010 and (2) is associated with a company in an industry that is outside the industry in which the best document 1005 is categorized. Some methods 1020 may query a predefined list of people (e.g., a list of politicians and/or government officials, a list of document authors, a list of chief operating officers (CEOs) of companies, etc.) and information associated with the people.

While FIG. 10 shows that each method 1020 receives information from the databases 1015 as input, some methods 1020 may not access some or all of the databases 1015. For example, a method 1020 may use lexical analysis to analyze the best document 1005 to generate a set of candidate identity attributes 1025. As another example, a method 1020 may utilize a technique that searches for keywords in the content of the document and/or the proximity (e.g., number of words) between the keywords. Furthermore, some methods 1020 may use a combination of any of the techniques explained above and/or other techniques. For instance, a method 1020 of some embodiments uses the output of the identification module 1030 as the generated set of candidate identity attributes.

Based on the sets of candidate identity attributes 1025 and the corresponding relevancy scores generated by the methods 1020, the identification module 1030 identifies the title and company identity attributes 1035 of a person with the interesting name 1010. Different embodiments may identify the title and company identity attributes 1035 differently. For instance, the identification module 1030 of some embodiments may (1) identify a candidate company identity attribute that has the highest relevancy score compared to other candidate company identity attributes in the sets of candidate identity attributes 1025 as the company identity attribute and (2) identify as the title identity attribute a candidate title identity attribute that has the highest relevancy score compared to other candidate title identity attributes in the sets of candidate identity attributes 1025. Alternatively, or in conjunction with the relevancy scores, the identification module 1030 of some embodiments uses other factors (e.g., normalization factor, confidence factor, etc.) and/or uses other scoring techniques to identify the company and title identity attributes for the name in the document.

Figure 11:
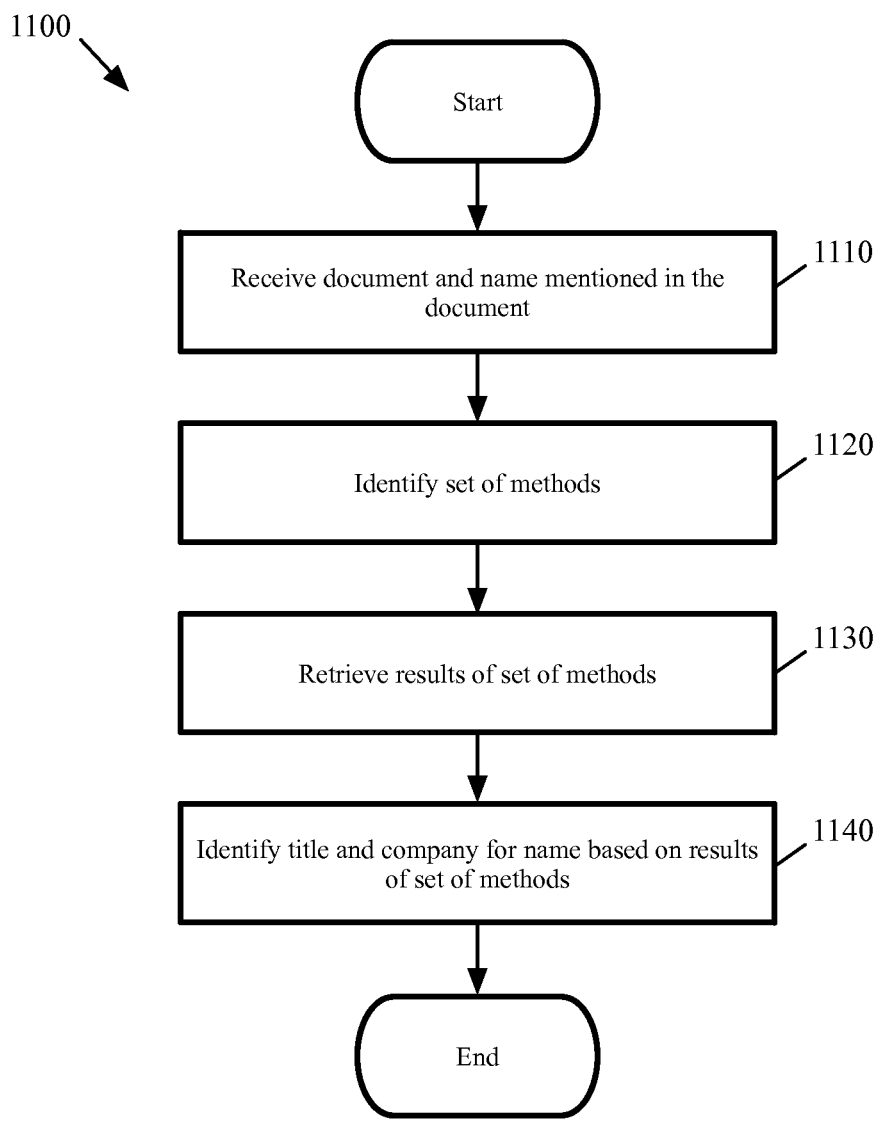
FIG. 11 conceptually illustrates a process of some embodiments for identifying a person based on a name in a document.
Figure 17:
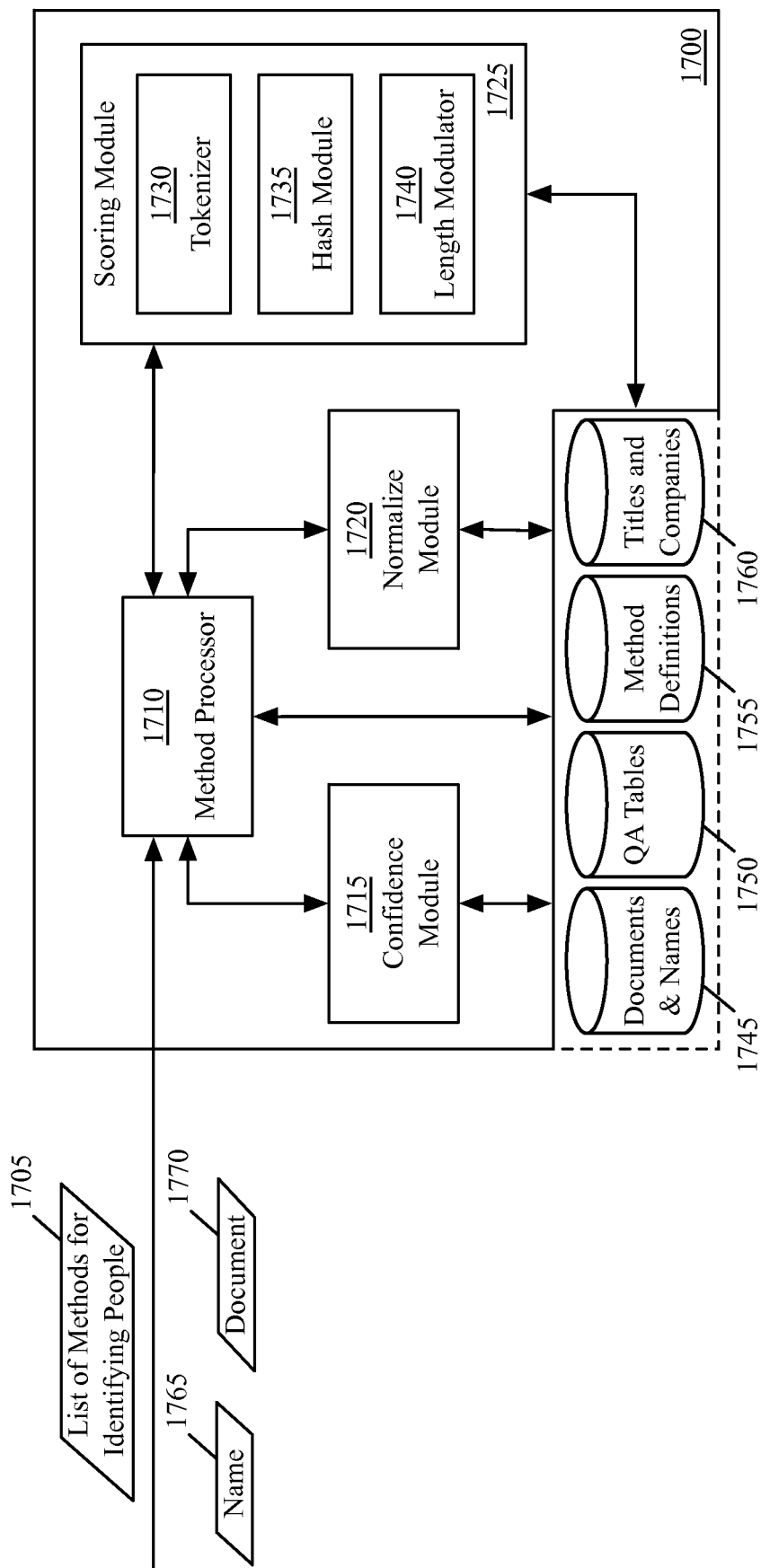
FIG. 17 conceptually illustrates a software architecture of an identification module of some embodiments.

FIG. 11 conceptually illustrates a process 1100 of some embodiments for identifying a person based on a name in a document. In some embodiments, the process 1100 is performed for identifying a person based on an interesting name in a best document, the details of which are described above in Section I. The process 1100 of some embodiments is performed by an identification module, such as the ones described above and below by reference to FIGS. 1, 10, and 17).

The process 1100 starts by receiving (at 1110) a document and a name that occurs in the document. In some embodiments, the process 1100 receives a reference to the document (e.g., a uniform resource locator (URL)) and the name that occurs in the document, and retrieves the document from a location specified by the document reference (e.g. the Internet, a document storage, etc.).

Next, the process 1100 identifies (at 1120) a set of methods that each generates (1) a set of candidate identity attributes and (2) a relevancy score for each candidate identity attribute. As described above, an identity attribute of some embodiments is an attribute used for identifying a person. Also, a relevancy score of some embodiments is a value that represents a degree of correctness between a candidate identity attribute and the identity of a person who has the name in the document.

The process 1100 then retrieves (at 1130) results from the set of methods. In some embodiments, the results from the methods are a set of candidate identity attributes for each method and a relevancy score for each candidate identity attribute. In addition, the results of some embodiments may include other information, such as the identity attribute type of each candidate identity attribute, the normalization factor of each method, the confidence factor of each method, etc.

Finally, the process 1100 identifies (at 1140) (1) company and (2) title identity attributes that identify a person having the name in the document based on the results from the set of methods. The process 1100 of some embodiments identifies as the company identity attribute a candidate company identity attribute that has the highest relevancy score compared to other candidate company identity attributes. Similarly, the process 1100 of such embodiments may identify as the title identity attribute a candidate title identity attribute that has the highest relevancy score compared to other candidate title identity attributes. As such, the process 1100 may identify different types of identity attributes that have been generated by different methods (e.g., a company identity attribute generated by method A and a title identity attribute generated by method B). Alternatively, or in conjunction with the relevancy scores, the process 1100 of some embodiments uses other factors (e.g., normalization factor, confidence factor, etc.) and/or uses other scoring techniques to identify the company and title identity attributes for the name in the document.

An example of another scoring technique that the process 1100 uses in some embodiments involves the processing of candidate identity attributes on an identity attribute type basis. That is, the process 1100 processes candidate identity attributes of a first type (e.g., company) to identify a first identity attribute, processes candidate identity attributes of a second type (e.g., title) to identify a second identity attribute, etc.

In some embodiments, the subsequent processing of candidate identity attributes of a particular type is based on the identity attributes that have been identified by the process 1100. For instance, the methods of some embodiments may generate candidate identity attributes in pairs of company and title identity attributes (e.g., as illustrated by the candidate person data structure in FIG. 12) for identifying a same person (but different pairs of identity attributes may identify different persons). In such cases, the process 1100 may process the candidate company identity attributes and identify a company identity attribute. When the process 1100 subsequently processes the candidate company identity attributes, the process 1100 only processes the candidate title identity attributes that are paired with a candidate company identity attribute that has a token that is included in the identified company identity attribute. In other words, the process 1100 does not consider nor process candidate title identity attributes that are paired with a candidate company identity attribute that does not have any tokens in common with the tokens of the identified company identity attribute.

Although the example provided above describes identifying a company identity attribute and subsequently eliminating candidate title identity attributes from consideration based on the identified company identity attribute when identifying a title identity attribute, the process 1100 of some embodiments processes the identity attributes in reverse in a similar manner. That is, the process 1100 identifies a title identity attribute and subsequently eliminates candidate company identity attributes from consideration based on the identified title identity attribute when identifying a company identity attribute. In some embodiments, the process 1100 (1) processes the candidate identity attributes to identify a company identity attribute which is used to identify a title identity attribute, (2) repeats the processing of the candidate identity attributes to identify a title identity attribute which is used to identify a company identity attribute, and (3) cross correlate the two results to identify a final company identity attribute and a title identity attribute. Moreover, this technique may be applied multiple different types of identity attributes, with each iteration eliminating candidate identity attributes from consideration based on previously identified identity attributes.

The discussion of FIGS. 10 and 11 above describes identifying a company identity attribute and a title identity attribute for a name in a document. However, one of ordinary skill in the art will recognize that the identification module of some embodiments may identify additional and/or other types of identity attributes for a name in a document.

A. Data Structures

The above section describes an identification module of some embodiments that receives, for a name in a document, several sets of candidate identity attributes and corresponding relevancy scores from several different methods. Based on the sets of candidate identity attributes and the corresponding relevancy scores, the identification module identifies a set of identity attributes that identify a person having the name in the document. In some embodiments, the identification module generates and stores different data structures to represent the information (e.g., the sets of candidate identity attributes, relevancy scores, and identified set of identity attributes).

Figure 12:
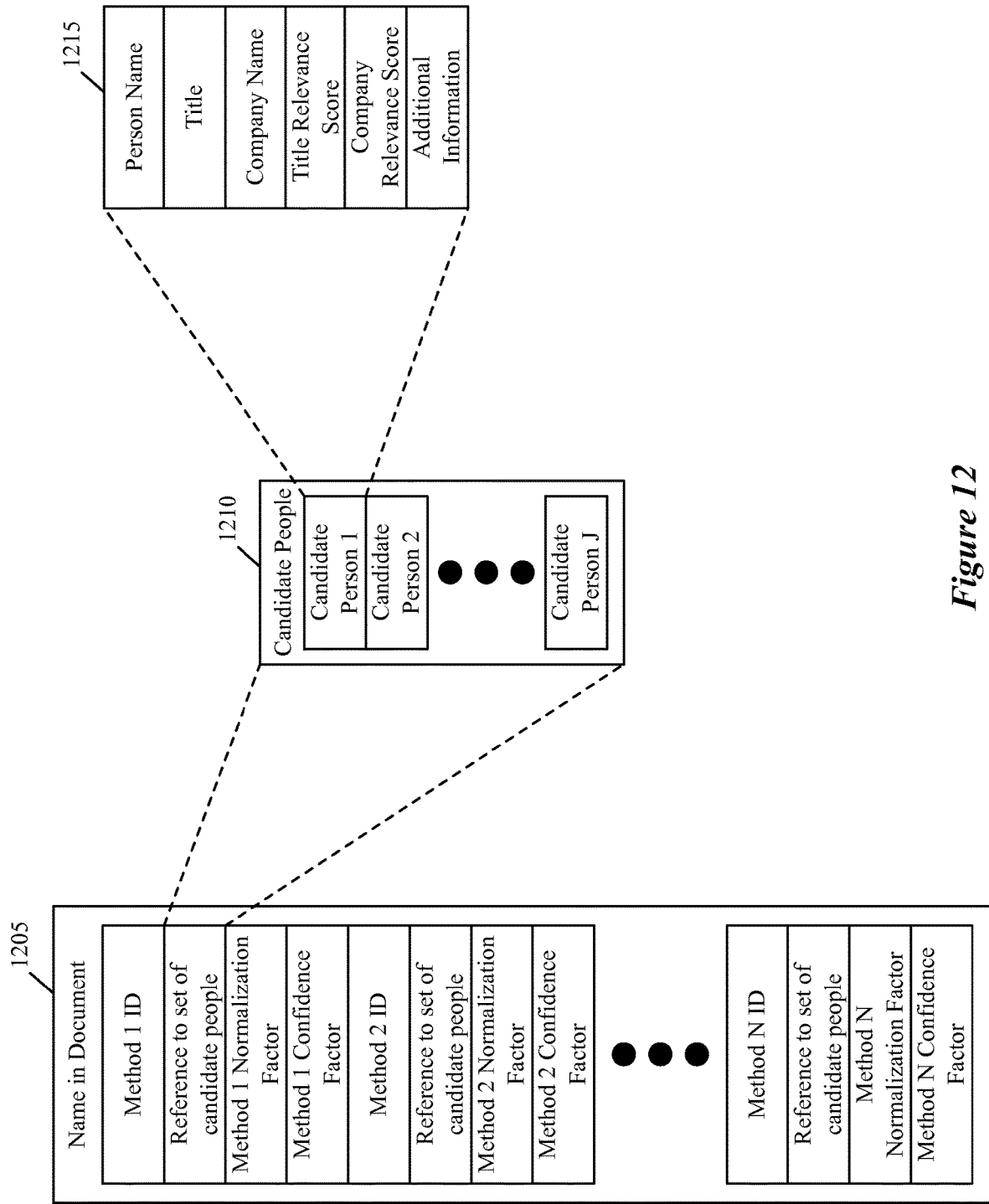
FIG. 12 conceptually illustrates a data structure for a name in a document according to some embodiments of the invention.

FIG. 12 conceptually illustrates a data structure 1205 for a name in a document, a candidate people data structure 1210, and a candidate person data structure 1215. In some embodiments, the identification module creates and stores the data structures 1205-1215 when the identification module receives the sets of candidate identity attributes and relevancy scores from the several different methods.

The data structure 1205 stores data related to each of the methods. As shown, a method identifier (ID), a reference to a set of candidate people, a normalization factor, and a confidence factor are stored for each method 1 to N. The method ID is a unique identifier for identifying a particular method. As mentioned above, different methods may generate relevancy scores that fall within different ranges of values. Therefore, the data structure 1205 stores a normalization factor associated with a method that converts the relevancy scores generated by the method to a particular range of values. This way, the relevancy scores for each method may be compared on the same range of values. As noted above, different methods may have different probabilities of producing candidate identity attributes that correctly identify a person. Thus, the data structure 1205 stores a confidence factor, which is, in some embodiments, a value provided by a third party that represents a probability that a candidate identity attribute generated by a process based on a name in a document, correctly identifies the actual person referred to by the name in the document.

The candidate people data structure 1210 stores a list of candidate persons. A candidate person, in some embodiments, is a person who is identified by a set of candidate identity attributes. In this example, each candidate person is identified by a company identity attribute (company name) and a title identity attribute (title). As shown, the candidate person data structure 1215 includes a person name, title, company name, title relevance score, company relevance score, and additional information. The additional information may include a person's biography, an image, copyright information, etc.

As explained above, different methods may generate different amounts of candidate identity attributes. In this example, each method generates two types of identity attributes: (1) a company and (2) a title. Specifically, each method in this example generates a company identity attribute and a title identity attribute for each candidate person. As shown in FIG. 12, method 1 generated J number of candidate persons (i.e., 2×J candidate identity attributes).

Figure 13:
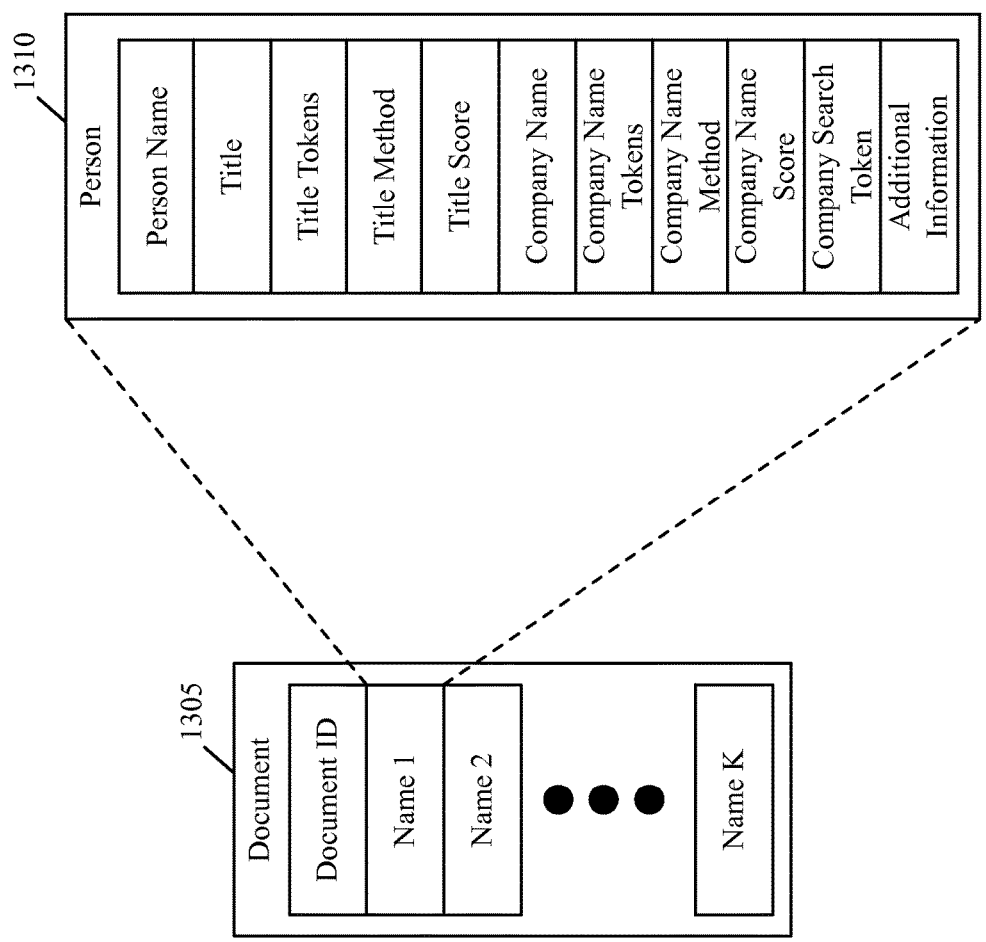
FIG. 13 conceptually illustrates a data structure for a set of identity attributes for a name in a document according to some embodiments of the invention.

FIG. 13 conceptually illustrates (1) a document data structure 1305 for a set of identity attributes for a name in a document and (2) a person data structure 1310. In some embodiments, the identification module creates and stores the data structures 1305 and 1310 when the identification module identifies a set of identity attributes for identifying a person having the name in the document.

The document data structure 1305 includes a document ID, which is a unique identifier for identifying a document. In addition, the document data structure 1305 includes several names that occur in the document. As shown, the person data structure 1310 includes a person name, a title, title tokens, a title method, a title score, a company name, company name tokens, a company name method, a company search token, and additional information. The title method is the name (or ID) of the method that generated the candidate title identity attribute, which the identifier module identified as an identity attribute for identifying the person. Similarly, the company name method is the name (or ID) of the method that generated the candidate company identity attribute, which the identifier module identified as an identity attribute for identifying the person. The title tokens are a set of tokens that resulted from the tokenization of the title. The company name tokens are a set of tokens that resulted from the tokenization of the company name.

B. Scoring Candidate Identity Attributes

As mentioned above, different embodiments identify a set of identity attributes for a name in a document using different scoring techniques. For instance, in cases where methods generate different types of candidate identity attributes (e.g., company, title, etc.), the identification module of some embodiments calculates the candidate identity attributes on an identity attribute type basis. One scoring technique that calculates scores for candidate identity attributes is based on the frequency of words across all words in the candidate identity attributes of a particular type.

Figure 14:
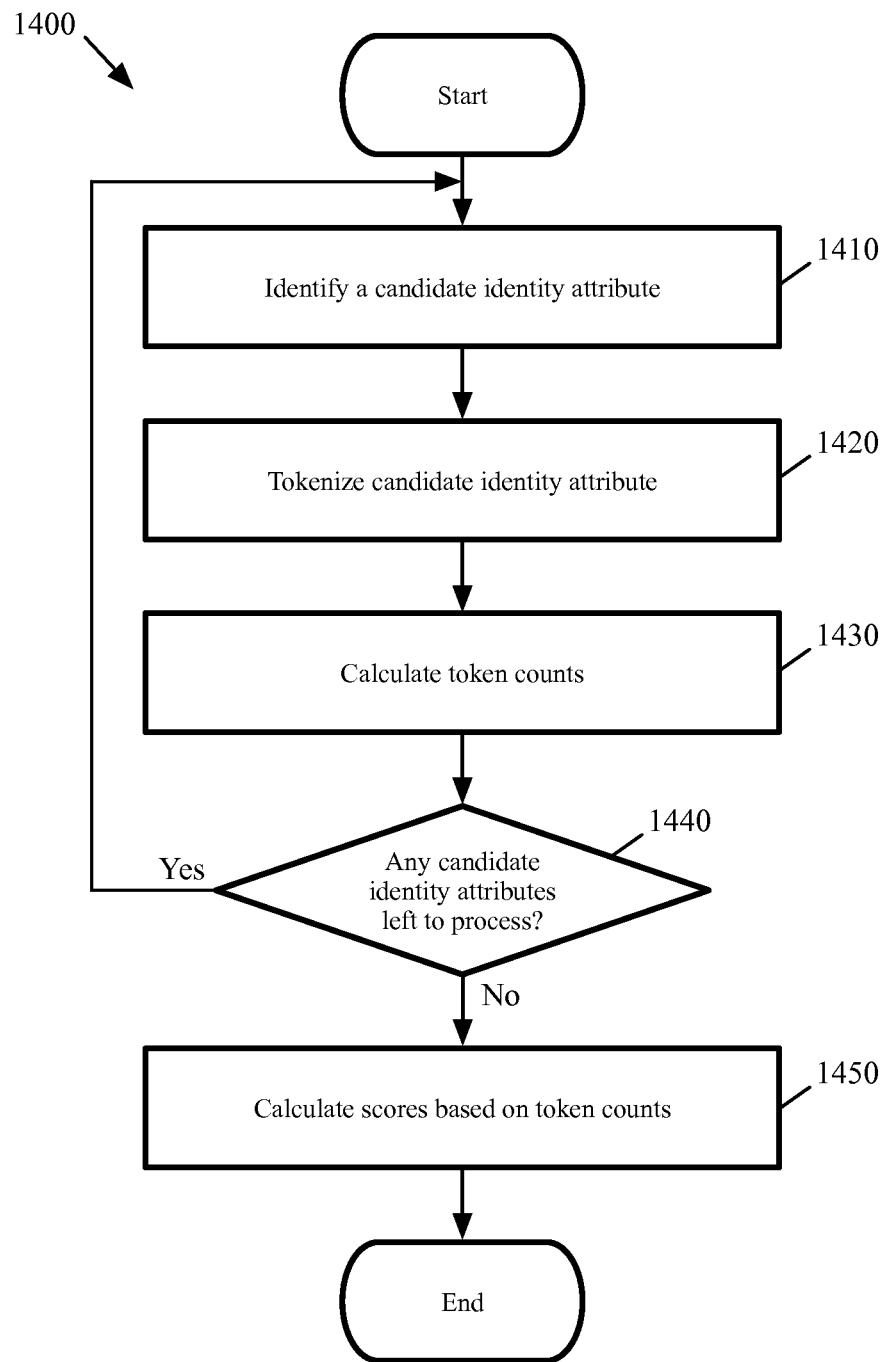
FIG. 14 conceptually illustrates a process of some embodiments for calculating scores for candidate identity attributes.

FIG. 14 conceptually illustrates some such process 1400 of some embodiments for calculating scores for candidate identity attributes of a particular type. In some embodiments, an identification module, such as the one described above by reference to FIG. 1 or FIG. 10, performs the process 1400. The identification module of some embodiments iteratively performs the process 1400 for each identity attribute type when it receives the sets of candidate identity attributes and relevancy scores from the methods.

The process begins by identifying (at 1410) a candidate identity attribute from the sets of candidate identity attributes. Next, the process 1400 tokenizes (at 1420) the candidate identity attribute. In some embodiments the process 1400 tokenizes the candidate identity attribute by parsing the candidate identity attribute in order to separate the candidate identity attribute into tokens (e.g., words).

The process 1400 then calculates (at 1430) token counts of the same or similar tokens. In some embodiments, the process 1400 utilizes a hash map to keep token counts of each of the same or similar tokens. In other embodiments, the process 1400 may use other ways to enumerate each of the same or similar tokens.

After calculating the token counts, the process 1400 determines (at 1440) whether any candidate identity attribute is left to process. When the process 1400 determines that a candidate identity attribute is left to process, the process 1400 returns to operation 1410 to continue processing any remaining candidate identity attributes in the sets of candidate identity attributes. Otherwise, the process 1400 continues to 1450.

Figures 15A, 15B:
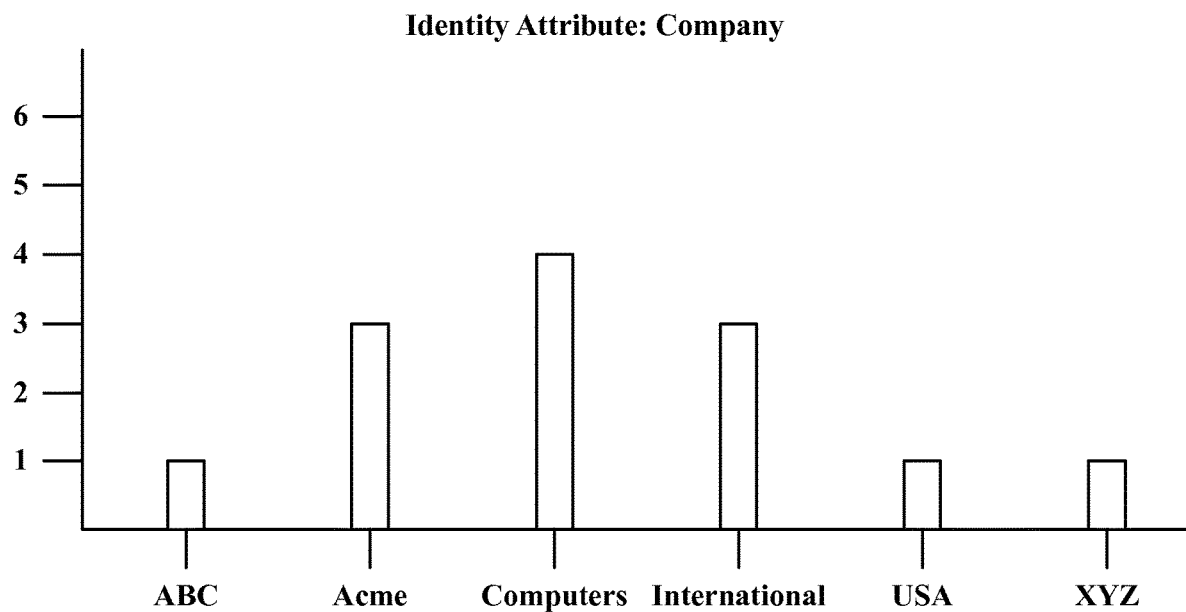
FIGS. 15A-B illustrate an example of tokenizing several candidate identity attributes of a particular type.

FIGS. 15A-B illustrate an example of tokenizing several candidate identity attributes of a particular type. As shown in FIG. 15A, several candidate identity attributes have been tokenized. The first, third and fifth candidate identity attributes have been separated into three tokens. The second and fourth candidate identity attributes have been separated into two tokens. FIG. 15B shows a histogram of the token illustrated in FIG. 15A. Specifically, the tokens "ABC", "USA", and "XYZ" each has a token count of 1, "Acme" and "International" each has a token count of 3, and the token "Computers" has a token count of 4.

Finally, the process 1400 calculates (at 1450) scores for each of the candidate identity attributes based on the token counts. In some embodiments, the process 1400 calculates a score for a candidate identity attribute by (1) assigning a value to each token in the candidate identity attribute that amounts to the number of instances the token occurred across all the candidate identity attributes and (2) calculates a sum of the values. Referring to FIGS. 15A-B, the score for the first candidate identity attribute is 10, the score for the second candidate identity attribute is 5, the score for the third candidate identity attribute is 8, the score for the fourth candidate identity attribute is 6, and the score for the fifth candidate identity attribute is 8.

Using the score calculation technique described above might result in higher scores calculated for candidate identity attributes that contain more tokens compared to candidate identity attributes that contain less tokens. To mitigate this effect, the process 1400 of some embodiments may assign a second value to each token in the candidate identity attribute that decreases in value for each successive token in the candidate identity attribute. This second value is multiplied by the first value in some embodiments. The second values are assigned, in some embodiments, such that tokens are given no weight (i.e., assigned a value of zero) after a defined number of successive tokens. For instance, the process 1400 may assign a first token a value of 1, a second token a value of 0.75, a third token a value of 0.5, a fourth token a value of 0.25, and any other tokens a value of 0.

The above discussion of FIGS. 14 and 15A-B describes calculating a score for a candidate identity attribute based on unmodified token counts. Alternatively, some embodiments calculate the score for a candidate identity attributes based on weighted token counts.

Figure 16:
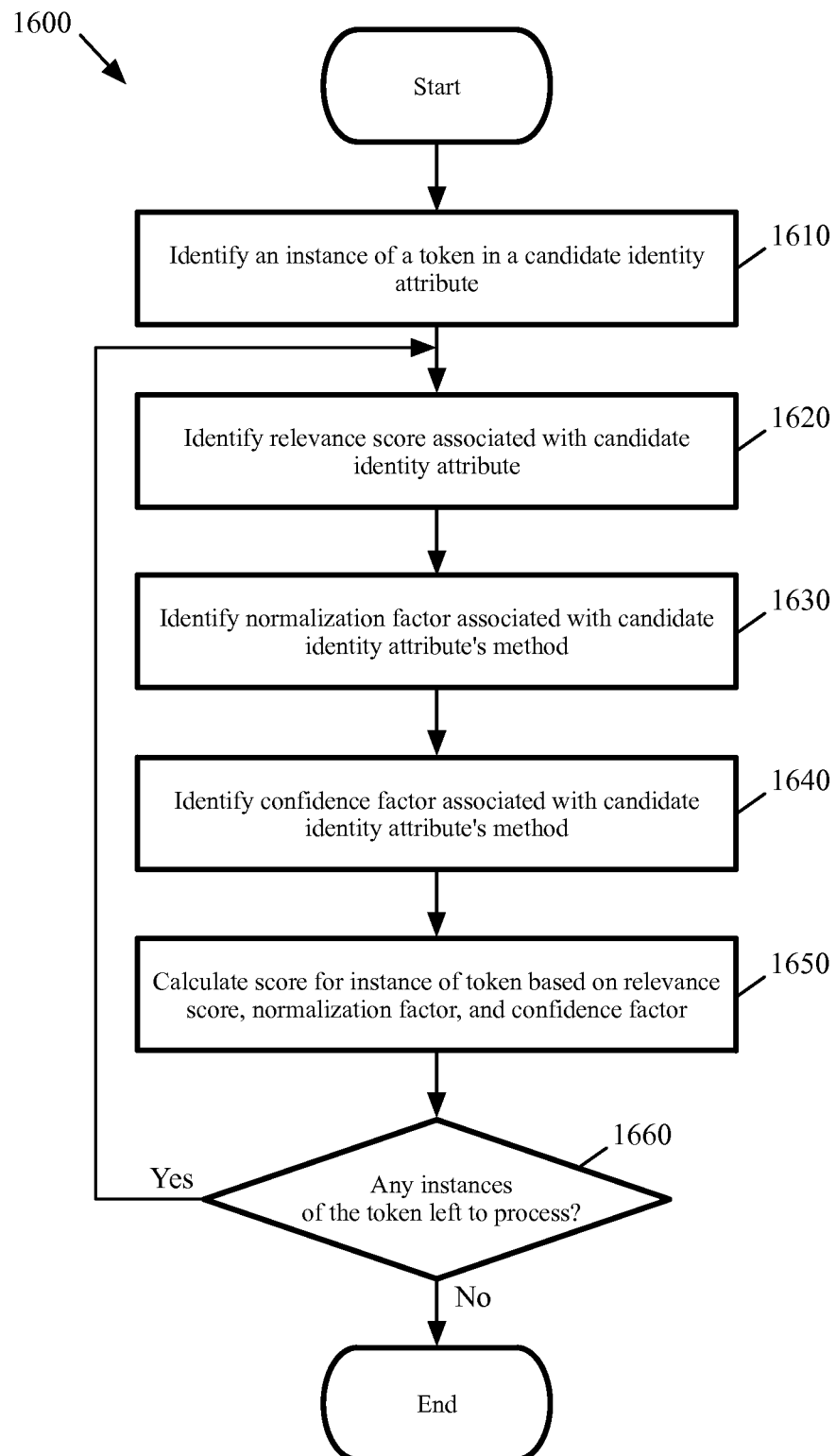
FIG. 16 conceptually illustrates a process of some embodiments for calculating weighted token counts.

FIG. 16 conceptually illustrates a process 1600 of some embodiments for calculating a weighted token count for the same or similar tokens. Since the process 1600 is performed for a token count for the same or similar tokens, the process 1600 is iteratively performed for each token count of the same or similar tokens. Referring to FIG. 15B as an example, the process 1600 would be performed for each token count for the tokens "ABC", "Acme", "Computers", "International", "USA", and "XYZ".

In some embodiments, the process 1600 is performed as part of the process 1400. Specifically, the process 1600 of such embodiments is performed after the candidate identity attributes are tokenized and the token counts are calculated (operations 1410-1440), but before the scores for the candidate identity attributes are calculated (operation 1450). In some embodiments, an identification module, such as the one described above by reference to FIG. 1 or FIG. 10, performs the process 1600.

The process 1600 begins by identifying (at 1610) an instance of a token in a candidate identity attribute. In some embodiments, the process 1600 identifies an instance of the token by iterating through each candidate identity attribute in the sets of candidate identity attributes generated by the different methods.

Next, the process 1600 identifies (at 1620) a relevance score associated with the candidate identity attribute in which the instance of the token is identified. The process 1600 then identifies (at 1630) a normalization factor associated with the method that generated the candidate identity attribute in which the instance of the token is identified. As noted above, a normalization factor of some embodiments is for converting the relevancy scores generated by the method to a particular range of values.

After identifying the normalization factor, the process 1600 identifies (at 1640) a confidence factor associated with the method that generated the candidate identity attribute in which the instance of the token is identified. The confidence factor of some embodiments is a value provided by a third party that represents a probability that a candidate identity attribute generated by a process based on a name in a document, correctly identifies the actual person referred to by the name in the document.

The process 1600 then calculates (at 1650) a score for the instance of the token based on the identified relevance score, the normalization factor, and the confidence factor. In some embodiments, the process 1600 calculates the score by multiplying the relevance score, the normalization factor, and the confidence factor together. The process 1600 then adds the calculated score to the sum of calculated scores for the token.

Finally, the process 1600 determines (at 1660) whether there is any instance of the token left to process. In some embodiments, the process 1600 makes such determination by continuing to iterate through any remaining candidate identity attributes that have not been processed. When process 1600 identifies an instance of the same or similar token, the process 1600 returns to operation 1620 to continue processing the instance of the token. When the process 1600 has iterated through all the candidate identity attributes, the process 1600 ends.

C. Software Architecture FIG. 17 conceptually illustrates a software architecture of an identification module 1700 of some embodiments. In some embodiments, the identification module 1700 is a module that (1) receives a best document in which an interesting name occurs, sets of candidate identity attributes, and corresponding relevancy scores, and (2) outputs a set identity attributes that identifies a person having the interesting name in the best document, as illustrated in FIG. 10. The identification module 1700 of some embodiments performs the process 1100, which is described above by reference to FIG. 11.

The identification module 1700 includes a method processor 1710, a confidence module 1715, a normalize module 1720, a scoring module 1725, a documents and names storage 1745, a quality assurance (QA) tables storage 1750, a method definitions storage 1755, and a titles and companies storage 1760. In some embodiments, the storages 1745-1760 are one physical storage while, in other embodiments, the documents and names, QA tables, method definitions, and titles and companies are stored in separate physical storages.

The method processor 1710 is responsible for processing the methods that generate candidate identity attributes and relevancy scores based on a name 1765 (e.g., an interesting name) in a document 1770 (e.g., a best document). The method processor 1710 receives a list of methods for identifying people 1705, the name 1765, and the document 1770 and uses them to retrieve the methods from the method definitions storage 1755, and the name and document from the names and documents and names storage 1745.

For some methods, the method processor 1710 performs the methods locally while, for other methods, the method processor 1710 sends a request to another entity (e.g., a computing device, a mobile device, a service, etc.) to perform the methods remotely. To process the methods, the method processor 1710 also requests from the confidence module 1715 and the normalize module 1720 the confidence factors and the normalization factors associated with each of the methods. After the method processor 1710 processes all the methods in the list of methods 1705, the method processor 1710 sends the candidate identity attributes and the relevancy scores to the scoring module 1725 for scoring.

In some embodiments, the confidence module 1715 receives requests from the method processor 1710 for confidence factors associated with methods. In response to such a request for a confidence factor associated with a method, the confidence module 1715 accesses the QA tables storage 1750 and/or the method definitions storage 1755 to retrieve the confidence factor associated with the method.

As noted above, a confidence factor of some embodiments is a value provided by a third party that represents a probability that a candidate identity attribute generated by a process based on a name in a document, correctly identifies the actual person referred to by the name in the document. Such a confidence factor is associated with each method used to generate candidate identity attributes. In some embodiments, a third party that provides a confidence factor for a method is a QA evaluator. To determine a confidence factor for a method, the QA evaluator might (1) retrieve a sample set of candidate identity attributes that are generated by the method for a name in a document, (2) enumerate (i) the number of instances when the candidate identity attributes correctly identifies the actual person referred to by the name in the document and (ii) the number of instances when the candidate identity attributes incorrectly identifies the actual person referred to by the name in the document, and (3) calculate a probability that the method generates correct candidate identity attributes based on the enumerated instances. In some embodiments, the QA evaluator calculates the probability by dividing the number of instances when the candidate identity attributes correctly identifies the actual person referred to by the name in the document by the number of candidate identity attributes in the sample set.

The normalize module 1720 receives requests from the method processor 1710 for normalization factors associated with methods. In response to a request for a method, the normalize module 1720 accesses the method definitions storage 1755 to retrieve the normalization factor associated with the method.

The scoring module 1725 is responsible for calculating score for each of the candidate identity attributes and, based on the calculated scores, identifying (1) a company identity attribute and (2) a title identity attribute that identify a person having the name 1765 in the document 1770. In some embodiments, the scoring module 1725 stores the identified set of identity attributes in the titles and companies storage 1760. As shown, the scoring module 1725 includes a tokenizer 1730, a hash module 1735, and a length modulator 1740.

The tokenizer 1730 parses each candidate identity attribute and tokenizes the candidate identity attribute in order to separate it into tokens (e.g., words). The hash module 1735 receives the tokens from the tokenizer 1730 and uses hash maps to keep token counts of the same or similar tokens. The length modulator 1740 is responsible for assigning values to the tokens in a candidate identity attribute that decreases in value for each successive token in the candidate identity attribute.

The operation of the identification module 1700 will now be described. The method processor 1710 receives the name 1765, the document 1770, and the list of methods 1705. When the method processor 1710 receives them, the method processor 1710 retrieves the name and document from the documents and names storage 1745, and the methods specified in the list of methods 1705 from the method definitions storage 1755.

The method processor 1710 then processes each of the methods specified in the list of methods 1705. For each method, the method processor 1710 instructs the confidence module 1715 to retrieve the corresponding confidence factor for the method from the QA tables storage 1750. In addition, the method processor 1710 instructs the normalize module 1720 to retrieve the corresponding normalization factor for the method from the method definitions storage 1755. Once the method processor 1710 has processed each of the methods specified in the method list 1705, the method processor 1710 sends the candidate identity attributes and relevancy scores generated by the methods to the scoring module 1725.

When the scoring module 1725 receives the candidate identity attributes and the relevancy scores, the tokenizer 1730 parses through each of the candidate identity attributes to separate the candidate identity attributes into tokens. The hash module 1735 receives the tokens from the tokenizer 1730 and keeps token counts of the same or similar tokens. For the tokens of each candidate identity attribute received from the tokenizer 1730, the length modulator 1740 assigns values to the tokens in a candidate identity attribute that decreases in value for each successive token in the candidate identity attribute.

Once all the candidate identity attributes have been processed by the tokenizer 1730, the hash module 1735, and the length modulator 1740, the scoring module 1725 calculates a score for each candidate identity attribute. In some embodiments, the scoring module 1725 calculates the scores by performing the processes described above by reference to FIGS. 14 and 16. Based on the calculated scores, the scoring module 1725 identifies a set of identity attributes for identifying a person who has the name 1765 in the document 1770.

III. Example System

Figure 18:
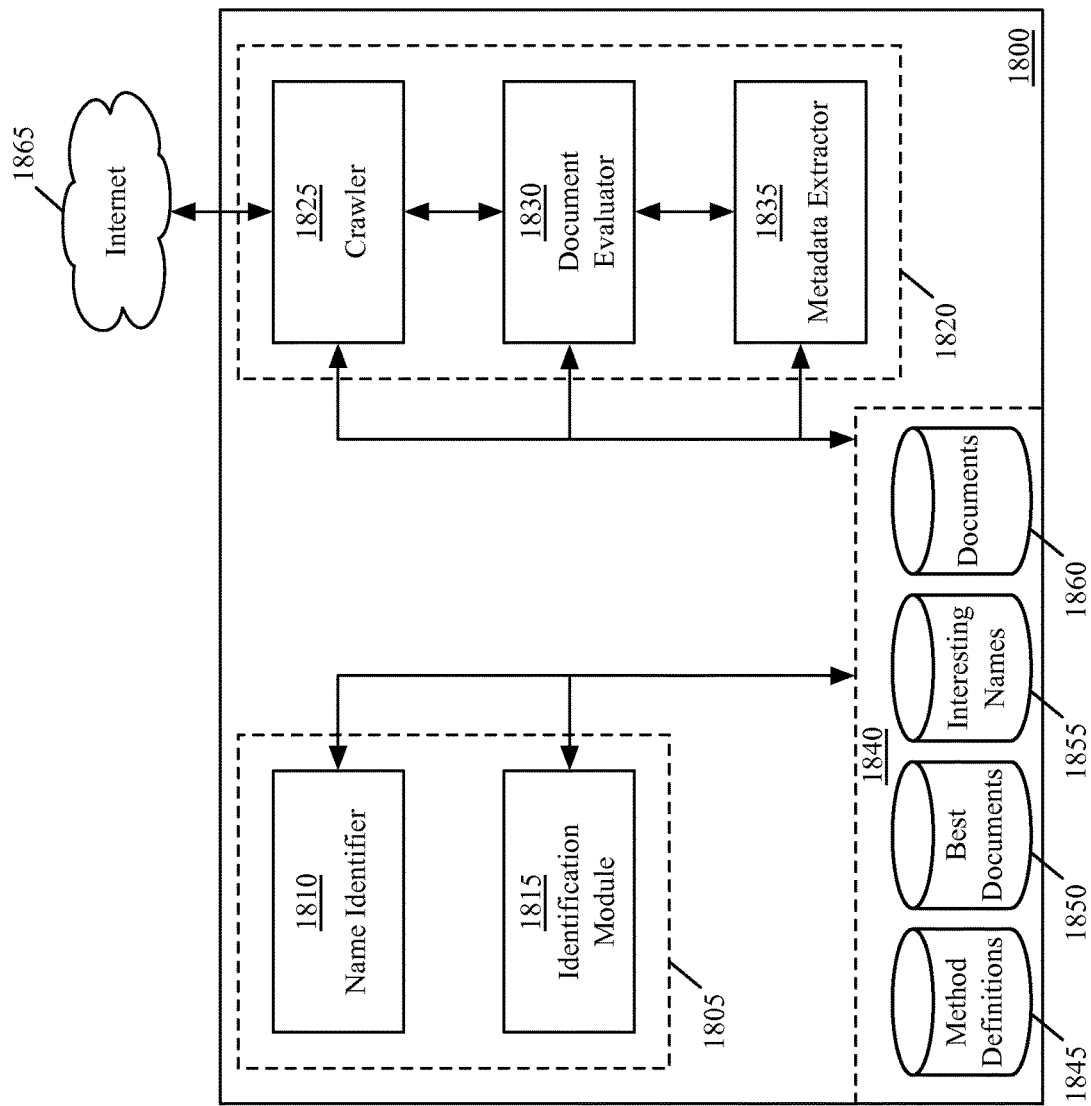
FIG. 18 conceptually illustrates a software architecture of a system of some embodiments.

As described above, the documents used to generate interesting names and best documents, which are subsequently processed to identify people that have the interesting names that occur in the best documents, may be documents that have been previously processed to extract various information. FIG. 18 conceptually illustrates a software architecture of such a system 1800 of some embodiments. In some embodiments, the system 1800 is implemented on a single computing device (e.g., a server) while, in other embodiments, the system 1800 may be implemented across multiple computing devices.

As shown, the system 1800 includes an identification system 1805, a document retrieval and classification system 1820, and storages 1840. The storages 1840 include a method definitions storage 1845, a best documents storage 1850, an interesting names storage 1855, and a documents storage 1860. In some embodiments, the method definitions storage 1845 includes the definitions of the different methods that may be used to generate candidate identity attributes, the best documents storage 1850 includes documents (or references to the documents) that are identified as best documents, the interesting names storage 1855 includes names (or references to names) that are identified as interesting names, the documents storage 1860 includes both copies of documents uploaded to the system or retrieved from the Internet as well as a document database storing relevancy information for the documents. The storages 1840 may be entirely implemented on one physical storage or may be implemented across multiple physical storages (e.g., one storage each for the method definitions, best documents, interesting names, and documents, multiple storages for the documents, etc.).

In some embodiments, the identification system 1805 is the identification system described above by reference to FIG. 1. The name identifier 1810 of some embodiments is the name identifier described above by reference to FIG. 8 or FIG. 9. Additionally, the identification module 1815 of some embodiments is the identification module described above by reference to FIG. 10 or FIG. 17.

The document retrieval and classification system 1820 includes a crawler 1825, a document evaluator 1830, and a metadata extractor 1835. The crawler 1825 is connected to the Internet 1865 and crawls the Internet on a regular basis in order to identify new documents. Some embodiments download copies of these new documents and store the copies in the documents storage 1860.

In some embodiments, the document evaluator 1830 evaluates each of the new documents using models for a wide variety of categories to determine which documents are relevant to which categories. The document evaluator 1830 of some embodiments also tags the documents in the documents storage 1860 with category tags and scores for the categories to which the documents are relevant. In some embodiments, the tagging entails entering information into a database entry for the document.

The metadata extractor 1835 analyzes the documents in the documents storage 1860 and extracts metadata about different types of entities in the documents. Examples of such entities include titles, companies, names, etc. In some embodiments, the metadata extractor 1835 stores the extracted information in the documents storage 1860. As described above, some methods use such metadata to generate candidate identity attributes for a name in a document.

In some embodiments, the document relevancy information is accessed by third party users of the system 1800 via remote terminals. The users may search for information related to a particular category, and are presented with information such as (i) lists of recently published documents that relate to the particular category, (ii) lists of recently published documents that relate to people associated with the particular category, (iii) links to the relevant documents, (iv) categories related to the particular category, (v) recent events related to the particular category as determined by analysis of the relevant documents, etc. When the category is a company, a graph of the company's stock price or recent management changes may be presented as well. Various other modules that are not shown in FIG. 18 may be used to enable user connections, present information to the user, analyze the documents related to a particular category to identify facts or events about the category subject, etc.

While many of the features of system 1800 have been described as being performed by one module (e.g., the name identifier 1810), one of ordinary skill will recognize that the functions might be split up into multiple modules (e.g., an interesting name identifier module and a best document identifier). Furthermore, the modules shown might be combined into a single module in some embodiments (e.g., the metadata extractor 1835 could be part of the document evaluator 1830).

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 19:
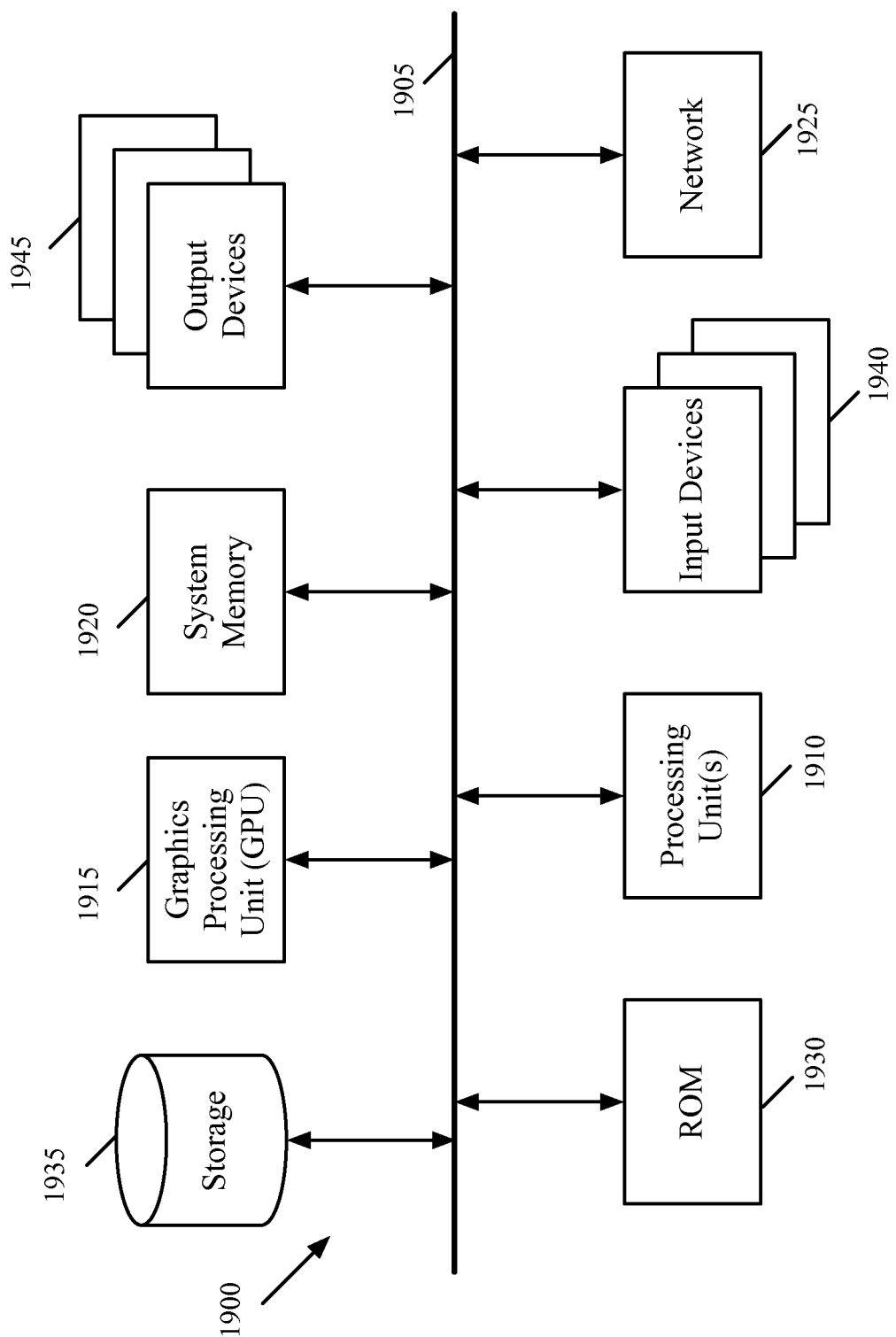
FIG. 19 conceptually illustrates an electronic system with which some embodiments of the invention are implemented.

FIG. 19 conceptually illustrates an electronic system 1900 with which some embodiments of the invention are implemented. The electronic system 1900 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1900 includes a bus 1905, processing unit(s) 1910, a graphics processing unit (GPU) 1915, a system memory 1920, a network 1925, a read-only memory 1930, a permanent storage device 1935, input devices 1940, and output devices 1945.

The bus 1905 collectively represents all system, peripheral, and chipset buses that communicatively connect the numerous internal devices of the electronic system 1900. For instance, the bus 1905 communicatively connects the processing unit(s) 1910 with the read-only memory 1930, the GPU 1915, the system memory 1920, and the permanent storage device 1935.

From these various memory units, the processing unit(s) 1910 retrieves instructions to execute and data to process in order to execute the processes of the invention. The processing unit(s) may be a single processor or a multi-core processor in different embodiments. Some instructions are passed to and executed by the GPU 1915. The GPU 1915 can offload various computations or complement the image processing provided by the processing unit(s) 1910.

The read-only-memory (ROM) 1930 stores static data and instructions that are needed by the processing unit(s) 1910 and other modules of the electronic system. The permanent storage device 1935, on the other hand, is a read-and-write memory device. This device is a non-volatile memory unit that stores instructions and data even when the electronic system 1900 is off. Some embodiments of the invention use a mass-storage device (such as a magnetic or optical disk and its corresponding disk drive) as the permanent storage device 1935.

Other embodiments use a removable storage device (such as a floppy disk, flash memory device, etc., and its corresponding disk drive) as the permanent storage device. Like the permanent storage device 1935, the system memory 1920 is a read-and-write memory device. However, unlike storage device 1935, the system memory 1920 is a volatile read-and-write memory, such as random access memory. The system memory 1920 stores some of the instructions and data that the processor needs at runtime. In some embodiments, the invention's processes are stored in the system memory 1920, the permanent storage device 1935, and/or the read-only memory 1930. For example, the various memory units include instructions for processing multimedia clips in accordance with some embodiments. From these various memory units, the processing unit(s) 1910 retrieves instructions to execute and data to process in order to execute the processes of some embodiments.

The bus 1905 also connects to the input and output devices 1940 and 1945. The input devices 1940 enable the user to communicate information and select commands to the electronic system. The input devices 1940 include alphanumeric keyboards and pointing devices (also called "cursor control devices"), cameras (e.g., webcams), microphones or similar devices for receiving voice commands, etc. The output devices 1945 display images generated by the electronic system or otherwise output data. The output devices 1945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 19, bus 1905 also couples electronic system 1900 to a network 1925 through a network adapter (not shown). In this manner, the computer can be a part of a network of computers (such as a local area network ("LAN"), a wide area network ("WAN"), or an Intranet, or a network of networks, such as the Internet. Any or all components of electronic system 1900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 2, 3, 4, 11, 14, and 16) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for identifying an entity having an entity attribute in a document, the method comprising:
    receiving, from each process of a plurality of processes, a corresponding set of candidate identity attributes that are each for identifying a particular entity having said entity attribute specified in the document, wherein each process of the plurality of processes generates the corresponding set of candidate identity attributes based on the entity attribute specified in the document;
    calculating a score for each candidate identity attribute in the sets of candidate identity attributes, wherein calculating the score for a particular candidate identity attribute comprising (1) identifying a set of tokens in the particular candidate identity attribute, (2) assigning a value to each token in the sets of tokens based on a token count that represents a number of instances of the token across the sets of candidate identity attributes and (3) calculating the score based on the assigned values; and
    identifying, based on the sets of scores calculated to the candidate identity attributes, an identity attribute from the sets of candidate identity attributes that identifies the entity having said entity attribute specified in the document.

2. The method of claim 1, wherein the entity is a name of a person.

3. The method of claim 1, wherein the entity attribute is a name of the person.

4. The method of claim 3, wherein the identity attribute is a title designated to the person.

5. The method of claim 3, wherein the identity attribute is a company with which the person is affiliated.

6. The method of claim 1, wherein the set of candidate identity attributes is a first set of candidate identity attributes, wherein the score is a first core, wherein the identity attribute is a first identity attribute, the method further comprising: receiving, from each process of the plurality of processes, a second set of candidate identity attributes that are each for identifying a particular entity having said entity attribute specified in the document, wherein each process of the plurality of processes generates the corresponding set of candidate identity attributes based on the entity attribute specified in the document; calculating, for each second set of candidate identity attributes, a second score for each candidate identity attribute in the second set of candidate identity attributes; and identifying, based on the second scores calculated for the second set of candidate identity attributes, a second identity attribute from the second sets of candidate identity attributes that identifies the entity having said entity attribute specified in the document.

7. The method of claim 1, wherein each process in the plurality of processes further generates a relevancy score for each candidate identity attribute, the relevancy score representing a degree of correctness that the particular entity identified by the candidate identity attribute is the entity.

8. The method of claim 7, wherein calculating the score for the particular candidate identity attribute further comprises calculating the score based on the particular candidate identity attribute's relevancy score.

9. The method of claim 7, wherein calculating the score for the particular candidate identity attribute further comprises calculating the score based on a normalization factor for converting the relevancy score to a particular range of values.

10. The method of claim 1, wherein calculating the score for the particular candidate identity attribute further comprises calculating the score based on a confidence factor that represents a probability that the particular candidate identity attribute correctly identifies the entity having said entity attribute specified in the document.

11. The method of claim 1, wherein the process in the plurality of processes is a first process, wherein a second process in the plurality of processes generates a set of candidate identity attributes by a query to an entity database.

12. The method of claim 1, wherein the process in the plurality of processes is a first process, wherein a second process in the plurality of processes comprises a service that generates a set of candidate identity attributes by performing lexical analysis on the document.

13. The method of claim 2, wherein calculating the relevance scores comprises:
processing the plurality of candidate identity attribute sets based on the first candidate identity attribute of each candidate identity attribute set to identify a subset of the plurality of candidate identity attribute sets; and
processing only the subset of the plurality of candidate identity attribute sets based on the second candidate identity attribute of each candidate identity attribute set.

14. A method for identifying a set of identity attributes for determining the identity of an entity, the method comprising:
identifying a particular entity that occurs more often than other entities in a set of documents;
identifying a plurality of candidate identity attribute sets by analyzing the particular entity and at least one document in the set of documents using a plurality of different processes that each identifies (i) a set of candidate identities corresponding to the particular entity and (ii) a candidate identity attribute set for each identified candidate identity, wherein at least one of the different processes analyzes a stored plurality of identities to identify candidate identities having the particular entity and that are related to an entity to which the at least one document is also related;
for each candidate identity attribute set of the plurality of candidate identity attribute sets, calculating a relevance score for each candidate identity attribute in the set that measures a level of correspondence between the particular entity and the candidate identity attribute; and
identifying, based on the relevance scores calculated for the candidate identity attributes of the different candidate identity attribute sets, a particular candidate identity attribute set for a particular identity that corresponds to the particular entity.

15. The method of claim 14, wherein identifying the plurality of candidate identity attribute sets comprises identifying a candidate identity attribute set based on a lexical analysis of the at least one document.

16. The method of claim 14 further comprising calculating a normalization factor that converts a particular relevance score calculated for a particular candida e identity attribute to a particular range of values.

17. The method of claim 14, wherein calculating a particular relevance score for a particular candidate identity attribute for a particular candidate identity comprises calculating a confidence factor that represents a probability that the particular candidate identity correctly identifies the entity referred to by the particular entity in the set of documents.

18. The method of claim 14, wherein each candidate identity attribute set comprises a first candidate identity attribute of a first type and a second candidate identity attribute of a second type.

19. The method of claim 18, wherein the particular entity is an entity of a person, the first type is a title of the person, and the second type is a company with which the person is affiliated.

* * * * *